(12) United States Patent
Nobori

(10) Patent No.: US 9,350,982 B2
(45) Date of Patent: May 24, 2016

(54) IMAGE DISPLAY DEVICE, IMAGE SUPPLY DEVICE, AND IMAGE PROCESSING METHOD WITH BRIGHTNESS EXPANDING PROCESSING FOR IMPROVED CONTRAST SENSITIVITY IN A 3D IMAGE

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 840 days.

(21) Appl. No.: 13/187,122

(22) Filed: Jul. 20, 2011

(65) Prior Publication Data

US 2012/0019524 A1    Jan. 26, 2012

(30) Foreign Application Priority Data

Jul. 22, 2010   (JP) .................................. 2010-164600
Jul. 22, 2010   (JP) .................................. 2010-164601

(51) Int. Cl.
*H04N 13/04* (2006.01)
*H04N 13/00* (2006.01)

(52) U.S. Cl.
CPC ....... *H04N 13/0427* (2013.01); *H04N 13/0025* (2013.01); *H04N 13/0459* (2013.01); *H04N 2013/0081* (2013.01)

(58) Field of Classification Search
CPC ................................................. H04N 13/0427
See application file for complete search history.

(56) References Cited

U.S. PATENT DOCUMENTS

| | | | |
|---|---|---|---|
| 6,111,596 A * | 8/2000 | Haskell et al. .................. | 348/42 |
| 2002/0021292 A1 | 2/2002 | Sakashita | |
| 2003/0095178 A1 * | 5/2003 | Shibayama .................... | 348/46 |
| 2007/0018951 A1 | 1/2007 | Nobori et al. | |
| 2007/0025683 A1 * | 2/2007 | Nobori ................. | G09G 3/3611 385/147 |
| 2007/0285574 A1 | 12/2007 | Nobori | |
| 2008/0036872 A1 | 2/2008 | Nobori | |
| 2009/0265660 A1 | 10/2009 | Nobori | |
| 2009/0284544 A1 | 11/2009 | Nobori | |
| 2011/0018976 A1 * | 1/2011 | Park .................... | H04N 13/0018 348/51 |
| 2011/0025825 A1 * | 2/2011 | McNamer .......... | H04N 13/0221 348/46 |

FOREIGN PATENT DOCUMENTS

| | | |
|---|---|---|
| JP | 2002-31846 A | 1/2002 |
| JP | 2007-41535 A | 2/2007 |
| JP | 2007-047244 A | 2/2007 |
| JP | 2007-58167 A | 3/2007 |
| JP | 2007-121541 A | 5/2007 |
| JP | 2007-212834 A | 8/2007 |
| JP | 2007-241172 A | 9/2007 |
| JP | 2008-15225 A | 1/2008 |
| JP | 2008-145938 A | 6/2008 |

(Continued)

*Primary Examiner* — James Pontius
(74) *Attorney, Agent, or Firm* — ALG Intellectual Property, LLC

(57) ABSTRACT

An image display device includes: a feature value calculating section which calculates an image feature value related to the brightness of image data using parallax between image data for a right eye and image data for a left eye which form 3D image data; an expanding coefficient calculating section which calculates an expanding coefficient, which is related to brightness expand processing, on the basis of the image feature value; a brightness expanding processing section which performs brightness expanding processing on the image data for the right eye and the image data for the left eye on the basis of the expanding coefficient; and an image display section which displays an image on the basis of the image data for the right eye and the image data for the left eye subjected to the brightness expanding processing.

11 Claims, 16 Drawing Sheets

(56) References Cited

FOREIGN PATENT DOCUMENTS

| JP | 2009-025445 A | 2/2009 |
|----|---------------|--------|
| JP | 2009-232308 A | 10/2009 |
| JP | 2009-276500 A | 11/2009 |
| JP | 2010-55108 A | 3/2010 |
| JP | 2010-204520 A | 9/2010 |
| JP | 2010-210722 A | 9/2010 |
| JP | 2010-211091 A | 9/2010 |
| JP | 2010-217914 A | 9/2010 |
| JP | 2010-244561 A | 10/2010 |
| JP | 2010-256915 A | 11/2010 |

* cited by examiner

IMAGE DISPLAY DEVICE, IMAGE SUPPLY DEVICE, AND IMAGE PROCESSING METHOD WITH BRIGHTNESS EXPANDING PROCESSING FOR IMPROVED CONTRAST SENSITIVITY IN A 3D IMAGE

The entire disclosure of Japanese Patent Application Nos. 2010-164600, filed Jul. 22, 2010 and 2010-164601, filed Jul. 22, 2010 are expressly incorporated by reference herein.

BACKGROUND

1. Technical Field

The present invention relates to an image display device having a modulation unit which modulates light emitted from a light source, an image supply device which supplies the image data to the image display device, and an image processing method.

2. Related Art

An image display device which projects an image for the right eye and an image for the left eye alternately on a screen on the basis of input image data for the right eye and input image data for the left eye in order to express an image in a three-dimensional manner is known (for example, refer to JP-A-2009-232308).

Moreover, among known image display devices which project an image on a screen, there is an image display device which performs brightness expanding processing on the image data in order to expand a dynamic range of an image projected on the screen and improve the contrast sensitivity (for example, refer to JP-A-2002-31846).

Here, a case is assumed in which brightness expanding processing as in JP-A-2002-31846 is executed on the image data for the right eye and the image data for the left eye in an image display device which projects an image for the right eye and an image for the left eye alternately, such as the image display device disclosed in JP-A-2009-232308.

In this case, it is necessary to execute the brightness expanding processing effectively taking into consideration that the image data for the right eye and the image data for the left eye corresponding to the image data for the right eye are data which are generated reflecting the parallax between left and right eyes in order to express an image in a three-dimensional manner.

SUMMARY

An advantage of some aspects of the invention is to execute brightness expanding processing effectively on the image data for the right eye and the image data for the left eye so that the parallax between the image data for the right eye and the image data for the left eye is reflected.

An aspect of the invention is directed to an image display device including: a feature value calculating section which calculates an image feature value related to the brightness of image data using parallax between image data for a right eye and image data for a left eye which form 3D image data; an expanding coefficient calculating section which calculates an expanding coefficient, which is related to brightness expanding processing performed on the image data for the right eye and the image data for the left eye, on the basis of the image feature value calculated by the feature value calculating section; a brightness expanding processing section which performs brightness expanding processing on the image data for the right eye and the image data for the left eye on the basis of the expanding coefficient calculated by the expanding coefficient calculating section; and an image display section which displays an image on the basis of the image data for the right eye and the image data for the left eye subjected to the brightness expanding processing.

According to this configuration, the feature value calculating section calculates the image feature value related to the brightness of image data using the parallax between the image data for the right eye and the image data for the left eye, and the expanding coefficient calculating section calculates the expanding coefficient on the basis of the image feature value calculated such that the parallax is reflected. Since the expanding coefficient is calculated in this way, the value of the expanding coefficient becomes a value in which the parallax between the image data for the right eye and the image data for the left eye is reflected. In addition, since the brightness expanding processing section performs the brightness expanding processing on the image data for the right eye and the image data for the left eye on the basis of the calculated expanding coefficient, the brightness expanding processing section can perform effective brightness expanding processing which reflects parallax.

In the image display device according to the aspect of the invention, the feature value calculating section may detect the amount of separation between each reference region, which is formed by dividing at least either the image data for the right eye or the image data for the left eye, and a region corresponding to the reference region in the other image data, calculate a parallax value positively correlated with the detected amount of separation, and calculate an image feature value using the calculated parallax value.

Here, the "amount of separation between one reference region in one image data item and a region corresponding to the one reference region in the other image data" is a value equivalent to the distance between the coordinates of the one reference region and the coordinates of the region corresponding to the one reference region when the image data for the right eye and the image data for the left eye are expanded in the same coordinate system.

In addition, the "region corresponding to the one reference region in the other image data" is a region, in which an image that reflects the parallax of an image shown by the reference region of one image data item is located, in the other image data.

The relationship between the size of parallax in one of the reference regions, which are formed by dividing one image data item, and the amount of separation between the one reference region and a region corresponding to the one reference region in the other image data is as follows. That is, for an image related to one object included in a 3D image to be expressed by the image data for the right eye and the image data for the left eye, the amount of separation between a region showing the object in the image data for the right eye and a region showing the object in the image data for the left eye becomes larger as the one object is located further forward in a virtual space corresponding to the 3D image (as parallax becomes larger). Accordingly, since the amount of separation between one reference region of one image data item and a region corresponding to the one reference region in the other image data is positively correlated with the size of parallax in the one reference region, the parallax increases as the amount of separation increases. In addition, the above explanation is based on the assumption that an object is present further forward than the reference plane, which is virtually set as a reference for distance determination, in a virtual space of the 3D image which is to be expressed by the image data for the right eye and the image data for the left eye.

Thus, according to the above-described configuration, the feature value calculating section calculates the parallax value positively correlated with the amount of separation described above and calculates the image feature value using the calculated parallax value. In addition, the parallax value used when calculating the image feature value is positively correlated with the amount of separation and is also positively correlated with the size of parallax in one reference region. Accordingly, by calculating the image feature value using the parallax value, it is possible to calculate the image feature value which reflects parallax (size of parallax) appropriately.

Moreover, in the image display device according to the aspect of the invention, the feature value calculating section may calculate the image feature value on the basis of information regarding the reference region, which has the calculated parallax value exceeding a predetermined threshold value, among the reference regions included in at least either the image data for the right eye or the image data for the left eye.

Here, a 3D image expressed by the image data for the right eye and the image data for the left eye may be formed by a background image showing the background and an image expressed with a certain degree of three-dimensional effect on the background image. In this case, the image expressed with a certain degree of three-dimensional effect tends to be important rather than the background image. Accordingly, when performing brightness expanding processing on the image data, it is necessary to perform the brightness expanding processing on the basis of an expanding coefficient suitable for the image data related to the image expressed with a three-dimensional effect.

According to the above-described configuration, the feature value calculating section calculates image feature values on the basis of the information regarding the brightness of a reference region which is most probably not a region related to the background image but a region related to the image to be expressed with a certain degree of three-dimensional effect because the parallax value exceeds a predetermined threshold value. For this reason, the expanding coefficient calculated on the basis of the calculated image feature values becomes a value calculated on the basis of a reference region related to an image excluding the background image, that is, a value suitable for the image data related to an image expressed with a three-dimensional effect which is not a background image.

Moreover, in the image display device according to the aspect of the invention, the feature value calculating section may give a weighting to at least either the image data for the right eye or the image data for the left eye such that the weighting is reflected in the calculated image feature value in proportion to the parallax value of the reference region and then calculate the image feature value on the basis of the information regarding each reference region.

Here, in a 3D image expressed by the image data for the right eye and the image data for the left eye, an image related to an object expressed so as to be present further forward tends to be an important image in which a three-dimensional effect or activeness is emphasized. Accordingly, when calculating the image feature value, it is necessary to reflect the information regarding a region showing the image, which is related to the object expressed so as to be present further forward, on the calculated image feature value.

According to the above-described configuration, the feature value calculating section gives a weighting to the image data such that the weighting is reflected in the calculated image feature value in proportion to the parallax value of the reference region and then calculates the image feature value on the basis of the information regarding each reference region. Therefore, the calculated image feature value becomes a value which reflects the information regarding a reference region showing an image related to the object located further forward.

Moreover, in the image display device according to the aspect of the invention, the feature value calculating section may detect the frequency of the reference regions with almost the same parallax value for at least either the image data for the right eye or the image data for the left eye, give a weighting to the image data such that the weighting is reflected in the calculated image feature value in proportion to the frequency of the reference regions, and then calculate the image feature value on the basis of the information regarding each reference region.

Here, in a 3D image expressed by the image data for the right eye and the image data for the left eye, an image related to an object, which has a large number of objects expressed such that the positions in a depth direction are almost the same compared with other objects, tends to be an important image in the 3D image. Accordingly, when calculating the image feature value, it is necessary to reflect the information regarding the reference region, which shows the image related to such an object, on the calculated image feature value. In addition, since the parallax value is a value corresponding to the size of parallax as described above, each reference region showing the image related to objects with almost the same position in a depth direction has almost the same parallax value.

According to the above-described configuration, the feature value calculating section detects the frequency of the reference regions with almost the same parallax value, gives a weighting to the image data such that the weighting is reflected in the calculated image feature value according to the information regarding the brightness of reference regions occurring very frequently, and then calculates the image feature value on the basis of the information regarding the brightness of each reference region. For this reason, the information regarding the reference region showing an image related to an object, which has a large number of objects expressed such that the positions in a depth direction are almost the same compared with other objects, is reflected in the calculated image feature value.

Moreover, the image display device according to the aspect of the invention may further include: a modulation section which modulates light emitted from a light source; and a light modulating section which modulates the light emitted from the light source corresponding to the brightness expanding processing of the brightness expanding processing section. The brightness expanding processing section may output the image data for the right eye and the image data for the left eye, which have been subjected to the brightness expanding processing, to the modulation section.

According to this configuration, for an image projected through the modulation section, it is possible to improve the contrast sensitivity by expanding the dynamic range of the image while maintaining the apparent brightness of the image.

Another aspect of the invention is directed to an image supply device which supplies image data to an image display device including: a feature value calculating section which calculates an image feature value related to the brightness of image data using parallax between image data for a right eye and image data for a left eye which form 3D image data; an expanding coefficient calculating section which calculates an expanding coefficient, which is related to brightness expanding processing performed on the image data for the right eye and the image data for the left eye, on the basis of the image feature value calculated by the feature value calculating section; and a brightness expanding processing section which performs brightness expanding processing on the image data for the right eye and the image data for the left eye on the basis of the expanding coefficient calculated by the expanding coefficient calculating section.

According to this configuration, the feature value calculating section calculates the image feature value related to the brightness of image data such that the parallax between the image data for the right eye and the image data for the left eye is reflected, and the expanding coefficient calculating section calculates the expanding coefficient on the basis of the image feature value calculated such that the parallax is reflected. Since the expanding coefficient is calculated in this way, the value of the expanding coefficient becomes a value in which the parallax between the image data for the right eye and the image data for the left eye is reflected. In addition, since the brightness expanding processing section performs the brightness expanding processing on the image data for the right eye and the image data for the left eye on the basis of the calculated expanding coefficient, the brightness expanding processing section can perform effective brightness expanding processing which reflects parallax.

Still another aspect of the invention is directed to an image processing method including: calculating an image feature value related to the brightness of image data using parallax between image data for a right eye and image data for a left eye which form 3D image data; calculating an expanding coefficient, which is related to brightness expanding processing performed on the image data for the right eye and the image data for the left eye, on the basis of the calculated image feature value; and performing brightness expanding processing on the image data for the right eye and the image data for the left eye on the basis of the calculated expanding coefficient.

According to this image processing method, the image feature value related to the brightness of image data is calculated reflecting the parallax between the image data for the right eye and the image data for the left eye, and the expanding coefficient is calculated on the basis of the image feature value calculated such that the parallax is reflected. Since the expanding coefficient is calculated in this way, the value of the expanding coefficient becomes a value in which the parallax between the image data for the right eye and the image data for the left eye is reflected. In addition, since the brightness expanding processing is performed on the image data for the right eye and the image data for the left eye on the basis of the calculated expanding coefficient, it is possible to perform effective brightness expanding processing which reflects parallax.

According to the aspects of the invention, it is possible to execute brightness expanding processing effectively on the image data for the right eye and the image data for the left eye so that the parallax between the image data for the right eye and the image data for the left eye is reflected.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, embodiments of the invention will be described with reference to the accompanying drawings.

Figure 1:
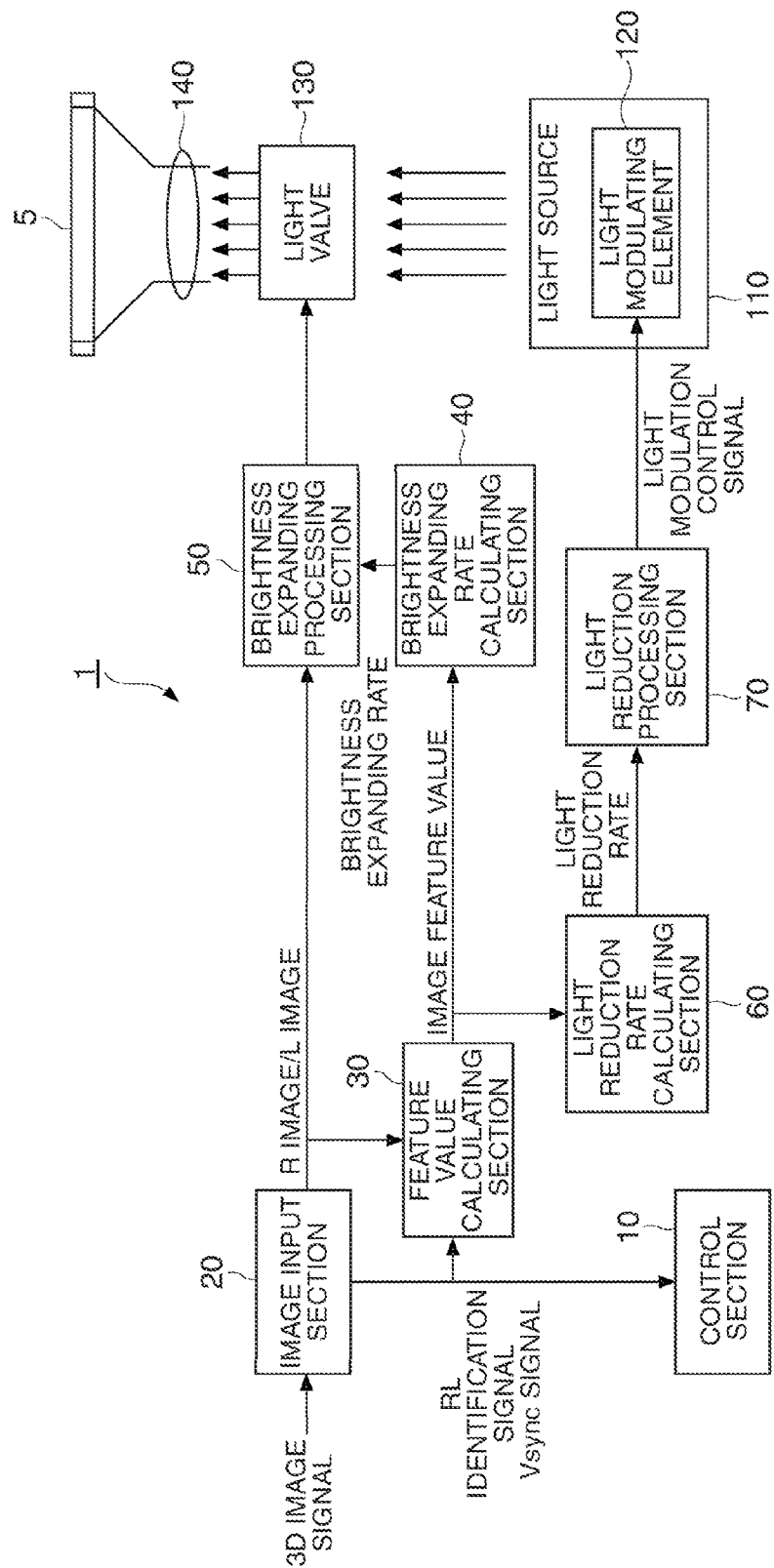
FIG. 1 is a block diagram showing the functional configuration of an image display device according to a first embodiment.

FIG. 1 is a view showing the functional configuration of an image display device 1 according to a first embodiment of the invention.

The image display device 1 shown in FIG. 1 is a projector which projects a 3D (three-dimensional) image on a screen 5, and includes a light source 110, a light valve 130 as a modulation unit that modulates light emitted from the light source 110, and a projection optical system 140 which condenses and diffuses light modulated by the light valve 130 and projects the light on the screen 5.

The image display device 1 projects a 3D image on the screen 5 in a time division method by projecting an image for the right eye and an image for the left eye alternately on the screen 5. A person who watches this projection image can see a 3D image by wearing an eyeglass type filter including a liquid crystal shutter, for example.

The light source 110 includes a light source, such as a xenon lamp, an ultrahigh-pressure mercury lamp, or an LED (Light Emitting Diode). In addition, the light source 110 may include a reflector and an auxiliary reflector which guide light emitted from the light source to the light valve 130, or may include a lens group (not shown), a polarizer, or the like for improving the optical properties.

The light source 110 includes a light modulation element 120 (light modulating section) which reduces the amount of light on the path through which the light emitted from the light source reaches the light valve 130. The light modulation element 120 includes a light reducing plate which blocks light emitted from the light source 110 and a driving circuit which adjusts the position or angle of the light reducing plate according to a predetermined light reduction rate, for example. The light modulation element 120 reduces the amount of light by moving the light reducing plate to the position at which light is to be blocked. The light modulation element 120 may be formed using a liquid crystal shutter instead of the light reducing plate. In this case, the light modulation element 120 reduces the amount of light by adjusting the transmittance of the entire liquid crystal shutter or a part of the liquid crystal shutter.

The light valve 130 is formed by three transmissive liquid crystal panels corresponding to each color of RGB. The light valve 130 draws the image data subjected to brightness expanding processing by the brightness expanding processing section 50, which will be described later, on a transmissive liquid crystal panel in synchronization with a vertical synchronization signal (Vsync).

The projection optical system 140 includes a prism which mixes the light beams of three colors of RGB modulated by the light valve 130, a lens group which forms a projection image mixed by the prism on the screen 5, and the like.

All constituent sections related to the display of an image including the light source 110, the light valve 130, and the projection optical system 140 are equivalent to an image display section of the invention, and some or all may be replaced with various kinds of functional sections described above as long as an image can be displayed.

In addition, the image display device 1 projects an image on the basis of an image source (not shown), which is stored in a built-in storage device, or a 3D image signal input from an external image supply device (not shown), such as a personal computer or various video players.

The image display device 1 includes: a control section 10 which controls the entire image display device 1; an image input section 20 which outputs image data for the right eye and image data for the left eye alternately on the basis of an image source or a 3D image signal input from an external image supply device; a feature value calculating section 30 which calculates an image feature value on the basis of the image data for the right eye and the image data for the left eye input from the image input section 20; a brightness expanding rate calculating section 40 (expanding coefficient calculating section) which calculates a brightness expanding rate (expanding coefficient) on the basis of the image feature value calculated by the feature value calculating section 30; the brightness expanding processing section 50 which performs brightness expanding processing according to the brightness expanding rate calculated by the brightness expanding rate calculating section 40; a light reduction rate calculating section 60 which calculates a light reduction rate from the image feature value calculated by the feature value calculating section 30; and a light reduction processing section 70 which reduces the amount of light by driving the light modulation element 120 on the basis of the light reduction rate calculated by the light reduction rate calculating section 60.

The image display device 1 performs adaptive light modulation processing on a projected image using each functional section described above. That is, the image display device 1 expands the dynamic range and improves the contrast sensitivity by reducing the amount of light emitted from the light source 110 while performing processing for expanding the gradation of an image drawn by the light valve 130.

Figure 2:
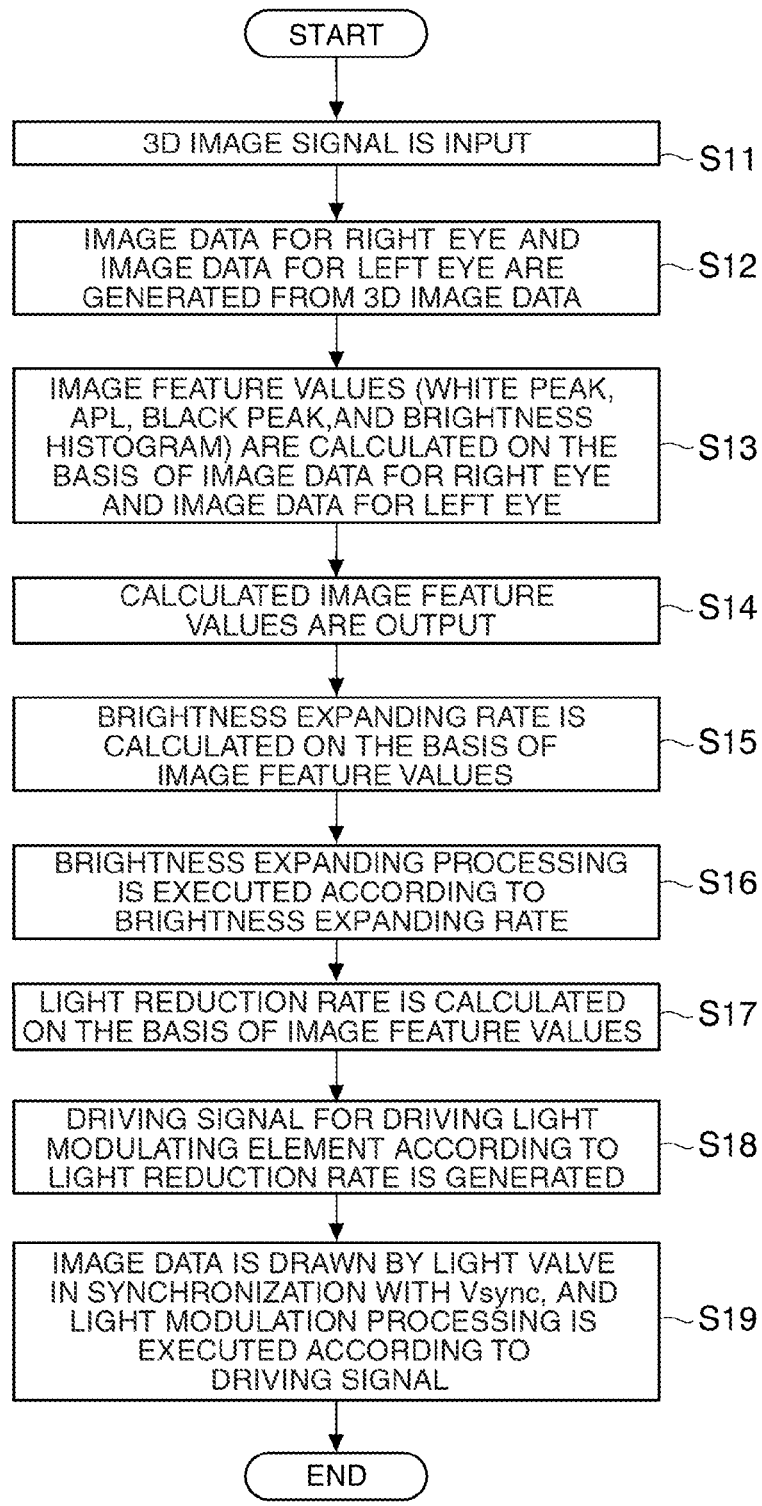
FIG. 2 is a flow chart showing the operation of an image display device in adaptive light modulation processing.

FIG. 2 is a flow chart showing the operation of the image display device 1, and shows the procedure in the adaptive light modulation processing executed by each section of the image display device 1 described above. Hereinafter, the adaptive light modulation processing will be described in detail with reference to FIG. 1 and the flow chart in FIG. 2.

The image input section 20 corresponds to various kinds of 3D image formats, such as a frame packing method, a side-by-side method, a top and bottom method. When a 3D image signal is input (step S11), the image input section 20 generates the image data for the right eye and the image data for the left eye from the input 3D image signal and outputs them to the feature value calculating section 30 and the brightness expanding processing section 50 in the input order (step S12).

In the present embodiment, the image data for the right eye and the image data for the left eye generated by the image input section 20 are bit mapped data. For each of pixels arrayed in a matrix on the data, color components of the RGB system are held as gradation values (for example, gradation values of 0 to 255 levels) for every pixel.

When the format of the input 3D image signal is a side-by-side method or a top and bottom method, the image input section 20 cuts the image data for the right eye and the image data for the left eye from the input signal, performs processing for expanding the cut image data according to the display resolution of the light valve 130, and outputs the expanded image data.

Here, from the image input section 20, the image data for the right eye and the image data for the left eye are alternately output to the feature value calculating section 30 and the brightness expanding processing section 50 such that the image data for the right eye becomes first data. In addition, the image input section 20 outputs an RL identification signal, which indicates whether the image data being output therefrom is the image data for the right eye or the image data for the left eye, and each vertical synchronization signal VSync of the image data for the right eye and the image data for the left eye. When the format of the input 3D image signal is a side-by-side method or a top and bottom method, the number of vertical synchronization signals included in this input signal is one for one frame. In this case, the image input section 20 cuts the image data for the right eye and the image data for the left eye from the input signal, and also generates and outputs the vertical synchronization signal VSync indicating each drawing start timing of the cut image data for the right eye and the cut image data for the left eye.

The control section 10 controls each section of the image display device 1 on the basis of the RL identification signal and the vertical synchronization signal VSync which are output from the image input section 20.

The image data for the right eye and the image data for the left eye, the RL identification signal, and the vertical synchronization signal VSync, which are output from the image input section 20, are input to the feature value calculating section 30. The feature value calculating section 30 identifies whether the image data, which is being input from the image input section 20, is the image data for the right eye or the image data for the left eye on the basis of the RL identification signal and the vertical synchronization signal VSync and acquires the image data for the right eye and the image data for the left eye.

Then, the feature value calculating section 30 calculates the image feature value on the basis of the acquired image data (step S13). The image feature value calculated by the feature value calculating section 30 is a maximum brightness value (white peak value) of the whole image data, an APL (Average Picture Level) that is an average value of brightness values, a minimum brightness value (black peak value), and a brightness histogram. The method of calculating the image feature value by the feature value calculating section 30 will be described in detail later.

Then, the feature value calculating section 30 outputs the calculated image feature value to the brightness expanding rate calculating section 40 and the light reduction rate calculating section 60 (step S14).

The brightness expanding rate calculating section 40 calculates a brightness expanding rate on the basis of the image feature value input from the feature value calculating section 30 (step S15).

Figure 3:
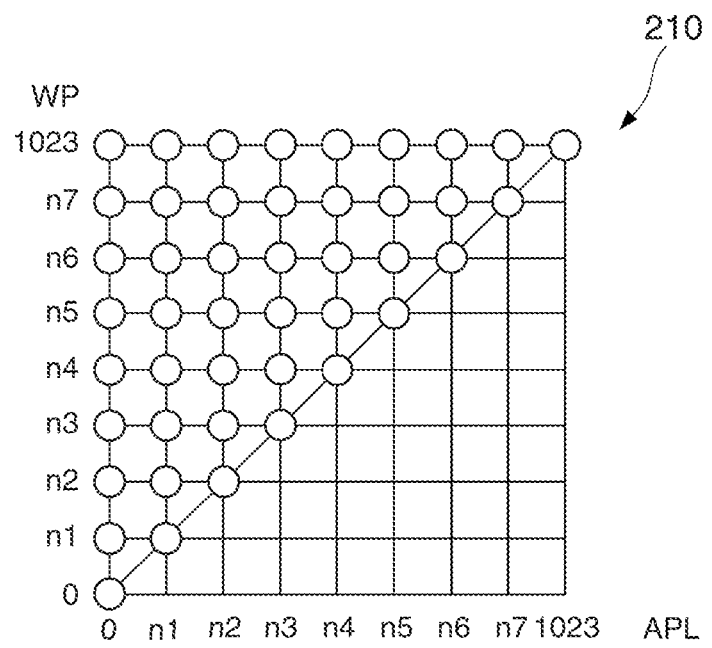
FIG. 3 is a schematic view showing an LUT for calculating the brightness expanding rate.

FIG. 3 is a schematic view showing an LUT 210 for calculating the brightness expanding rate. In the LUT 210 exemplified in FIG. 3, the brightness expanding rate is defined corresponding to the white peak value WP and the APL.

The brightness expanding rate calculating section 40 calculates a brightness expanding rate by acquiring the brightness expanding rate, which is defined in the LUT 210 corresponding to the white peak value WP and the value of the APL input from the feature value calculating section 30, referring to the LUT 210. When the white peak value WP and the value of the APL deviate from the lattice point at which the brightness expanding rate is defined, the brightness expanding rate calculating section 40 calculates a brightness expanding rate by performing an interpolation operation on the basis of brightness expanding rates defined at the three or four lattice points around the white peak value WP and the value of the APL. In this way, the brightness expanding rate calculating section 40 calculates a brightness expanding rate and outputs the calculated brightness expanding rate to the brightness expanding processing section 50.

In addition, the brightness expanding rate calculating section 40 may use a 3D LUT in which the brightness expanding rate is defined corresponding to the white peak value, the black peak value, and the APL, without being limited to the LUT 210 shown in FIG. 3. Alternatively, the brightness expanding rate calculating section 40 may use a two-dimensional LUT using the black peak value and the white peak value or the black peak value and the APL, or calculate the brightness expanding rate by operation processing based on one or more of the white peak value, the black peak value, the APL, and the brightness histogram.

The brightness expanding processing section 50 expands the gradation of the image data for the right eye and the image data for the left eye input from the image input section 20 at the brightness expanding rate calculated by the brightness expanding rate calculating section 40 (step S16). For example, assuming that the color information of the image data input from the image input section 20 to the brightness expanding processing section 50 is R, G, and B, the color information after brightness expanding is R', B', and G', and the brightness expanding rate is kg, R'=kg×R, G'=kg×G, and B'=kg×B.

The brightness expanding processing section 50 expands the brightness of a pair of an image data item for the right eye and an image data item for the left eye, which forms one 3D image data component, according to the common brightness expanding rate calculated by the brightness expanding rate calculating section 40. As a result, since the contrast sensitivity or the brightness of the pair of image data items for the right eye and image data for the left eye is acquired, adaptive light modulation of the 3D image data which does not cause a sense of unease can be performed without a variation.

On the other hand, the light reduction rate calculating section 60 calculates a light reduction rate on the basis of the image feature value input from the feature value calculating section 30 (step S17). Similar to the brightness expanding rate described with reference to FIG. 3, the light reduction rate can be calculated by referring to an LUT (not shown) in which the light reduction rate is defined corresponding to two or more of the white peak value, the APL, and the black peak value, for example. That is, the light reduction rate calculating section 60 acquires the light reduction rate which is defined in the LUT corresponding to the white peak value, the APL, or the black peak value input from the feature value calculating section 30. In addition, when the white peak value, the APL, or the black peak value input from the feature value calculating section 30 deviates from the lattice point at which the light reduction rate is defined, the light reduction rate calculating section 60 calculates a light reduction rate by performing an interpolation operation on the basis of light reduction rates defined at the surrounding three or four lattice points. In this way, the light reduction rate calculating section 60 calculates a light reduction rate and outputs the calculated light reduction rate to the light reduction processing section 70. In addition, the light reduction rate calculating section 60 may use a three-dimensional LUT without being limited to the two-dimensional LUT, or calculate the light reduction rate by operation processing based on one or more of the white peak value, the black peak value, the APL, and the brightness histogram.

Then, the light reduction rate calculating section 60 generates a driving signal for driving the light modulation element 120 corresponding to the calculated light reduction rate ka and outputs the driving signal to the light reduction processing section 70 (step S18).

Here, by control of the control section 10, the image data subjected to the brightness expanding processing by the brightness expanding processing section 50 is input to the light valve 130 and is drawn in synchronization with the vertical synchronization signal VSync. Moreover, in synchronization with this timing, the light modulation element 120 is controlled according to the driving signal input from the light reduction rate calculating section 60 by the light reduction processing section 70, such that light modulation is performed (step S19).

When the 3D image signal input to the image input section 20 is 60 frames/second, the image input section 20 outputs the image data for the right eye and the image data for the left eye alternately at 120 frames/second. The image data for the right eye and the image data for the left eye form 3D image data of one frame as a pair. When projecting an image at such a high speed, calculation of the brightness expanding rate and the light reduction rate and light modulation processing may be shifted in order that drawing of the light valve 130 is not delayed by operation in the light modulation processing. That is, when the brightness expanding rate is calculated by the brightness expanding rate calculating section 40 for the image data for the right eye and the image data for the left eye, which form the 3D image data of an n-th frame, and the light reduction rate is calculated by the light reduction rate calculating section 60, light modulation processing based on the brightness expanding rate and the light reduction rate is applied from an (n+1)-th frame. In this case, although the image data for which the brightness expanding rate and the light reduction rate have been calculated is different from the image data for which light modulation processing based on the brightness expanding rate and the light reduction rate is performed, a shift of this image data is only one frame. Accordingly, since a possibility that a sense of unease will occur due to this shift is very low, effects of an improvement in the contrast sensitivity based on the light modulation processing and a quality improvement based on expansion of a dynamic range can be expected.

Next, the concept of parallax in the present embodiment will be described.

In the following explanation, "image data for the right eye and image data for the left eye correspond to each other" means that these image data items are data generated in consideration of parallax between the left and right eyes in order to express one image in a three-dimensional manner. More specifically, when the format of an input 3D image signal is a side-by-side method or a top and bottom method, a pair of an image data item for the right eye and an image data item for the left eye generated by cutting from the 3D image signal is equivalent to corresponding image data. In addition, in the case of a method in which a 3D image signal related to the image data for the right eye and a 3D image signal related to the image data for the left eye are sequentially input, one image data item for the right eye and image data for the left eye which is input after the one image data item for the right eye are equivalent to corresponding image data in the present embodiment.

Figure 4:
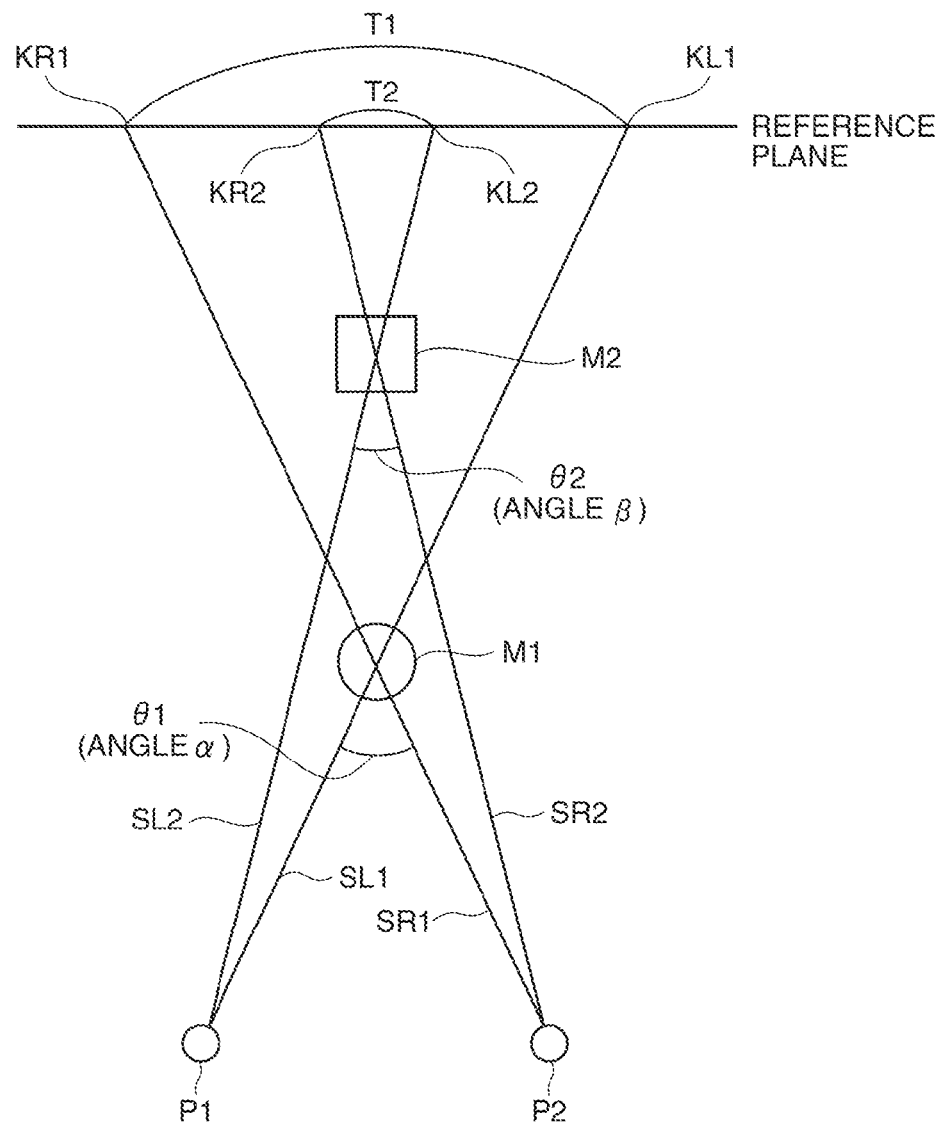
FIG. 4 is a view when a virtual space corresponding to a mixed 3D image is viewed from above in order to explain parallax.

FIG. 4 is a view for explaining parallax in the present embodiment.

FIG. 4 is a schematic view of a state when a virtual space (virtual space with a depth expressed by a mixed 3D image) related to an image expressed in a three-dimensional manner by the image data for the right eye and the image data for the left eye (hereinafter, referred to as a "mixed 3D image") is viewed from above.

An object expressed so as to be present further forward in the mixed 3D image is located further forward in a virtual space, and an object expressed so as to be present further backward in the mixed 3D image is located further backward in a virtual space. For example, in the virtual space shown in FIG. 4, an object M1 is located further forward than an object M2. Accordingly, in the mixed 3D image, an image related to the object M1 is expressed so as to be present further forward than an image related to the object M2. Moreover, in the present embodiment, it is assumed that all objects are located further forward than the reference plane as a reference for distance determination in a virtual space.

In addition, in FIG. 4, reference numeral P1 indicates a left eye point corresponding to the position of a left eye used to see the virtual space, and reference numeral P2 indicates a right eye point corresponding to the position of a right eye used to see the virtual space. As is known, the image data for the right eye and the image data for the left eye are generated using the parallax between the left eye located at the left eye point P1 and the right eye located at the right eye point P2.

As shown in FIG. 4, a virtual straight line SL1 connecting the left eye point P1 and the object M1 to each other and a virtual straight line SR1 connecting the right eye point P2 and the object M1 to each other cross each other with a parallax-corresponding angle θ1 of an angle α in the object M1, and a gap T1 is made between the point of intersection KL1 of the virtual straight line SL1 and the reference plane and the point of intersection KR1 of the virtual straight line SR1 and the reference plane.

Similarly, a virtual straight line SL2 connecting the left eye point P1 and the object M2 to each other and a virtual straight line SR2 connecting the right eye point P2 and the object M2 to each other cross each other with a parallax-corresponding angle θ2 of an angle β in the object M2, and a gap T2 is made between the point of intersection KL2 of the virtual straight line SL2 and the reference plane and the point of intersection KR2 of the virtual straight line SR2 and the reference plane.

The parallax-corresponding angles θ1 and θ2 and the gaps T1 and T2 are values appearing due to the positional difference between the left eye point P1 and the right eye point P2. As an object in a virtual space moves further forward, the parallax-corresponding angle θ and the gap T related to the object become larger values. On the contrary, as an object in a virtual space moves backward, the parallax-corresponding angle θ and the gap T related to the object become smaller values.

In addition, in the present embodiment, a conceptual expression of the parallax-corresponding angle θ or the gap T is equivalent to the "parallax". That is, the parallax in the present embodiment is a value conceptually indicating the value which is relatively large when the object is located further forward in a virtual space and relatively small when the object is located further backward in a virtual space due to the positional difference between the left eye point P1 and the right eye point P2.

Therefore, in the following explanation, for example, expression of "an image related to one object has larger parallax than images related to other objects" for an image related to one object included in the image data for the right eye and images related to other objects means that the one object is located further forward than the other objects in a virtual space in the mixed 3D image and also means that the image related to one object is expressed so as to be present further forward than the images related to the other objects in the mixed 3D image.

The size of parallax is reflected in the image data for the right eye and the image data for the left eye as follows.

Figure 5:
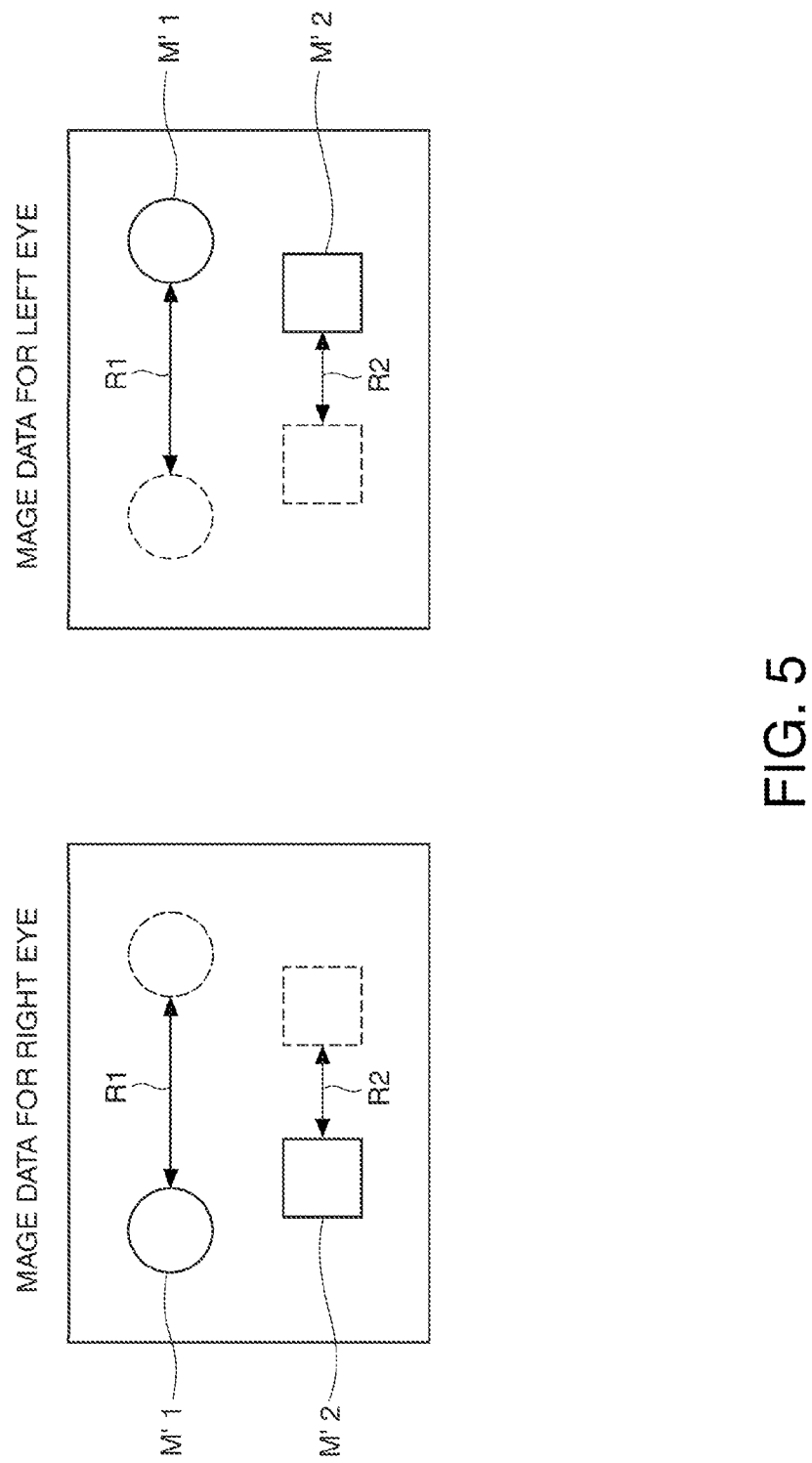
FIG. 5 is a schematic view showing the image data for the right eye and the image data for the left eye.

FIG. 5 is a schematic view showing the image data for the right eye and the image data for the left eye.

In FIG. 5, the image data for the right eye and the image data for the left eye are expanded so as to correspond to each other in the same coordinate system. That is, in a coordinate system, four corners of the image data for the right eye and four corners of the image data for the left eye are expanded to overlap each other, and the coordinates defined for one pixel included in the image data for the right eye and the coordinate defined for another pixel, which is disposed at the same position as the one pixel in the image data for the right eye, in the image data for the left eye are the same.

As described above, in the image data for the right eye and the image data for the left eye, pixels are arrayed in a matrix on the data. Accordingly, the coordinates of each pixel of the image data are uniquely defined as a relative position from the position, which is defined as an origin in the coordinate system, by expanding the image data in the coordinate system.

In the image data for the right eye and the image data for the left eye shown in FIG. 5, image data M'1 indicates image data corresponding to the object M1 shown in FIG. 4, and image data M'2 indicates image data corresponding to the object M2 shown in FIG. 4.

As shown in FIG. 5, the image data M'1 in the image data for the right eye and the image data M'1 in the image data for the left eye are disposed so as to be shifted from each other by the amount of separation R1. Similarly, the image data M'2 in the image data for the right eye and the image data M'2 in the image data for the left eye are disposed so as to be shifted from each other by the amount of separation R2.

These amounts of separation R1 and R2 are values corresponding to parallax between the objects M1 and M2. These amounts of separation R1 and R2 become larger values as the object in a virtual space is located further forward (as the parallax becomes larger). On the contrary, these amounts of separation R1 and R2 become smaller values as the object in a virtual space is located further backward (as the parallax becomes smaller). Specifically, in the case of an object which is located further forward in the virtual space and should be expressed so as to be present further forward in a mixed 3D image, that is, in the case of an object with large parallax, the amount of separation R corresponding to an image related to the object in the image data for the right eye and the image data for the left eye is large. On the contrary, in the case of an object which is located further backward in the virtual space and should be expressed so as to be present further backward in a mixed 3D image, that is, in the case of an object with small parallax, the amount of separation R corresponding to an image related to the object in the image data for the right eye and the image data for the left eye is small.

Next, the feature value calculating section 30 will be described in detail.

Figure 6:
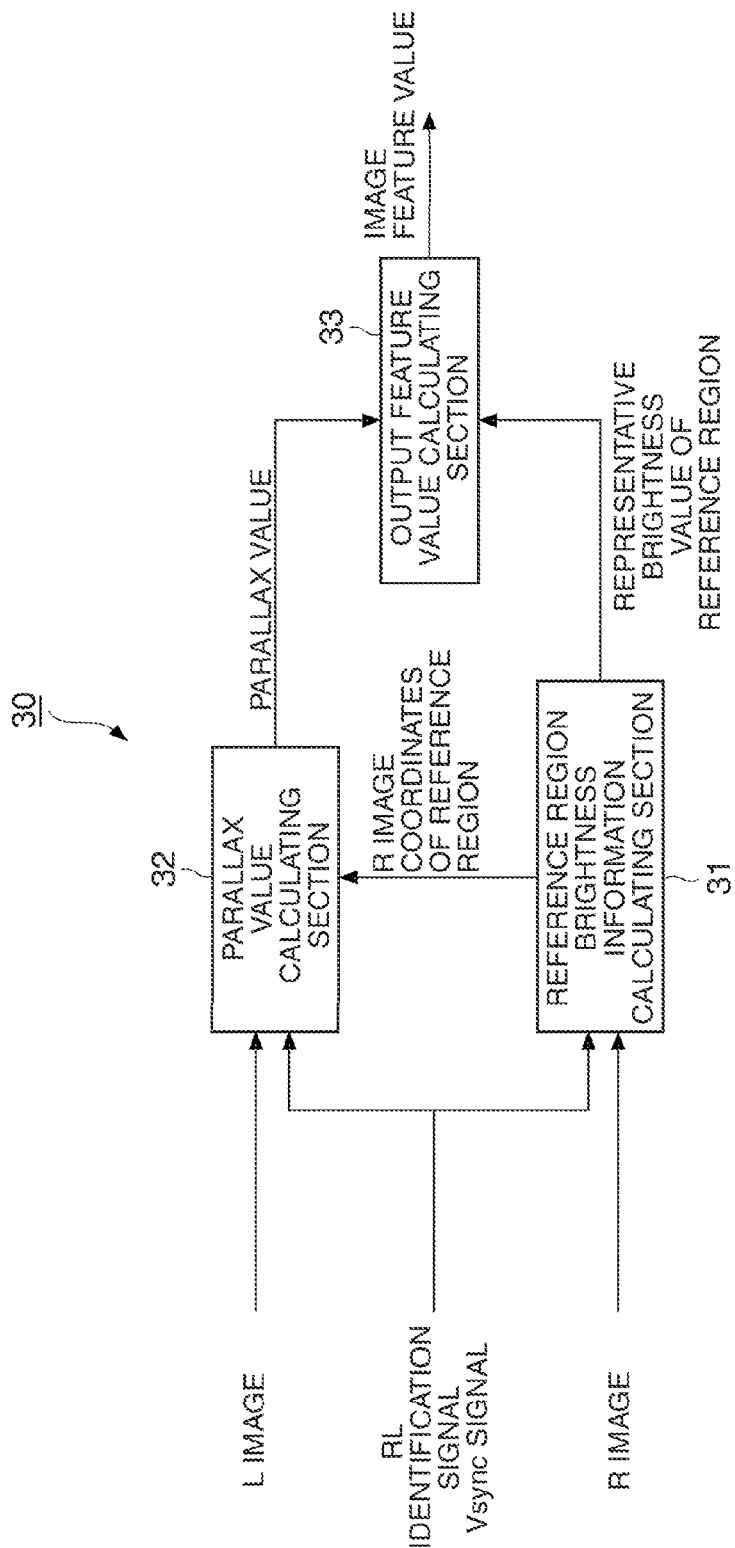
FIG. 6 is a block diagram showing the functional configuration of a feature value calculating section.

FIG. 6 is a block diagram showing the functional configuration of the feature value calculating section 30.

As described above, the feature value calculating section 30 calculates a maximum brightness value (white peak value), an APL (Average Picture Level), a minimum brightness value (black peak value), and a brightness histogram as the image feature values and outputs these calculated image feature values to the brightness expanding rate calculating section 40 and the light reduction rate calculating section 60.

In the following explanation, the maximum brightness value, the APL, the minimum brightness value, and the brightness histogram output from the feature value calculating section 30 are called an output white peak value, an output APL, an output black peak value, and an output brightness histogram, respectively, for clarity of explanation.

As shown in FIG. 6, the feature value calculating section 30 includes a reference region brightness information calculating section 31, a parallax value calculating section 32, and an output feature value calculating section 33.

Figure 7:
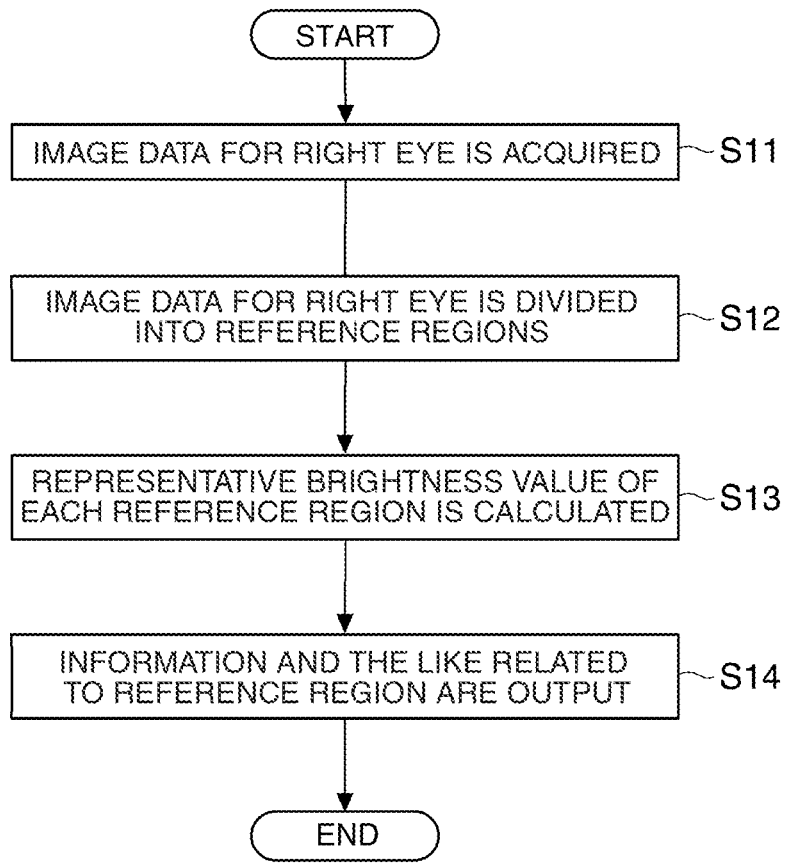
FIG. 7 is a flow chart showing the operation of a reference region brightness information calculating section.

FIG. 7 is a flow chart showing the operation of the reference region brightness information calculating section 31.

First, the reference region brightness information calculating section 31 identifies whether the image data, which is being input from the image input section 20, is the image data for the right eye or the image data for the left eye on the basis of the image data for the right eye, the image data for the left eye, the RL identification signal, and the vertical synchronization signal VSync input from the image input section 20 and acquires the image data for the right eye (step S21).

Then, the reference region brightness information calculating section 31 expands the acquired image data for the right eye in a predetermined coordinate system and also divides the image data for the right eye into reference regions (step S22).

Figure 8:
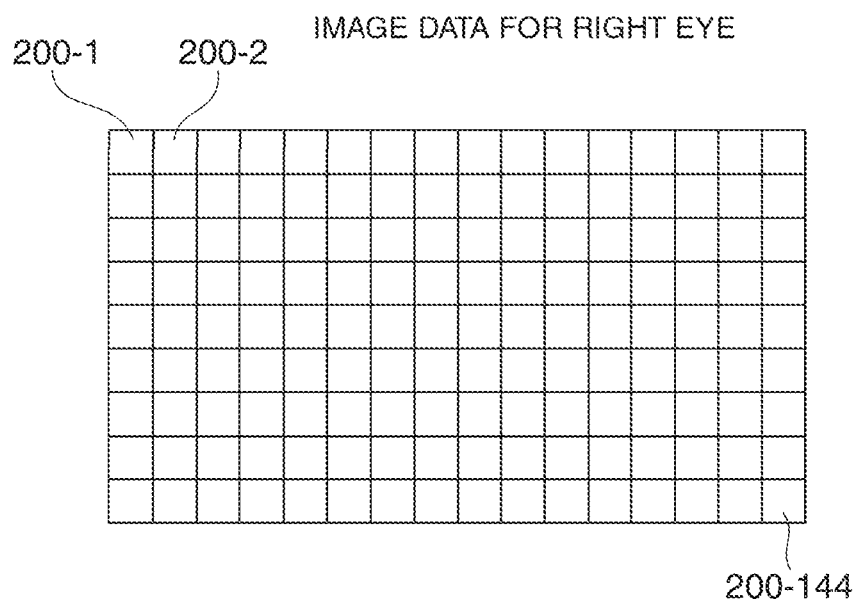
FIG. 8 is a schematic view showing reference regions formed by dividing the image data for the right eye.

FIG. 8 is a schematic view showing the configuration of the image data for the right eye expanded in the coordinate system.

In step S22, the reference region brightness information calculating section 31 divides the image data for the right eye, which is to be processed, into a plurality of reference regions (pixel blocks) 200. For example, the reference region brightness information calculating section 31 divides the image data for the right eye of 1920 pixels×1080 pixels, which is to be processed, into 144 reference regions 200-1 to 200-144 of 16 regions (horizontally)×9 regions (vertically), as shown in FIG. 8. In this case, each size of the reference regions 200-1 to 200-144 is 120 pixels in the vertical direction and 120 pixels in the horizontal direction.

Then, the reference region brightness information calculating section 31 calculates a value, which is obtained by averaging the brightness values of pixels included in the reference region 200, as a representative brightness value of the reference region 200 every reference region 200 (step S23).

As described above, in the image data for the right eye, color components of RGB are held as gradation values for each pixel. However, a maximum value of gradation values of RGB may be adopted as the brightness value of one certain pixel, or the total of 0.299×R signal value, 0.587×G signal value, and 0.144×B signal value may be adopted as the brightness of one certain pixel, for example.

In addition, the representative brightness value of one reference region is not limited to the average brightness value, and may be a brightness value of a pixel near the middle of the reference region 200, for example.

Then, the reference region brightness information calculating section 31 outputs the image data for the right eye and the information regarding the coordinates, which define each reference region 200, to the parallax value calculating section 32 and also outputs the representative brightness value of each reference region 200 to the output feature value calculating section 33 (step S24).

Figure 9:
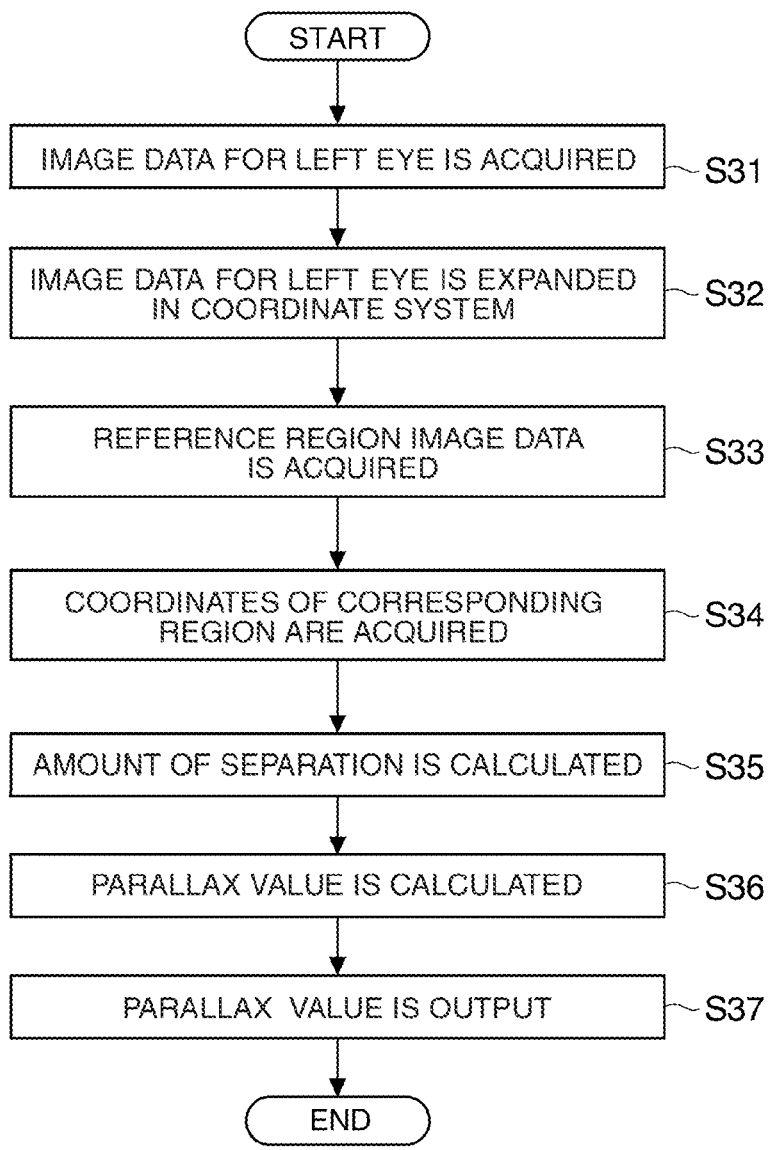
FIG. 9 is a flow chart showing the operation of a parallax value calculating section.

FIG. 9 is a flow chart showing the operation of the parallax value calculating section 32.

The parallax value calculating section 32 identifies whether the image data, which is being input from the image input section 20, is the image data for the right eye or the image data for the left eye on the basis of the image data for the right eye, the image data for the left eye, the RL identification signal, and the vertical synchronization signal VSync input from the image input section 20 and acquires the image data for the left eye (step S31).

Then, the parallax value calculating section 32 expands the acquired image data for the left eye in a predetermined coordinate system (step S32). This predetermined coordinate system is the same coordinate system as the coordinate system in which the image data for the right eye is expanded in step S22 of the flow chart shown in FIG. 7.

Then, the parallax value calculating section 32 specifies one of the reference regions 200, as the reference region 200 to be processed, on the basis of the image data for the right eye input from the reference region brightness information calculating section 31 and the information regarding the coordinates of the reference region 200 formed by dividing the image data for the right eye and acquires the image data corresponding to the reference region 200 (hereinafter, appropriately referred to as "reference region image data") specified as the reference region 200 to be processed (step S33). The image data corresponding to the specified reference region 200 is image data defined by the reference region 200 among the image data for the right eye. For example, referring to FIG. 8, in step S33, the parallax value calculating section 32 acquires the image data (reference region image data) in the region specified by the reference region 200-1 when the reference region 200-1 is set as a reference region to be processed.

Then, the parallax value calculating section 32 acquires the coordinates of a region, in which the image data corresponding to the reference region image data is located, in the image data for the left eye by performing template matching processing on the image data for the left eye using the reference region image data acquired in step S33 as a template image (step S34).

Hereinafter, the operation in step S34 will be described in detail.

Figure 10:
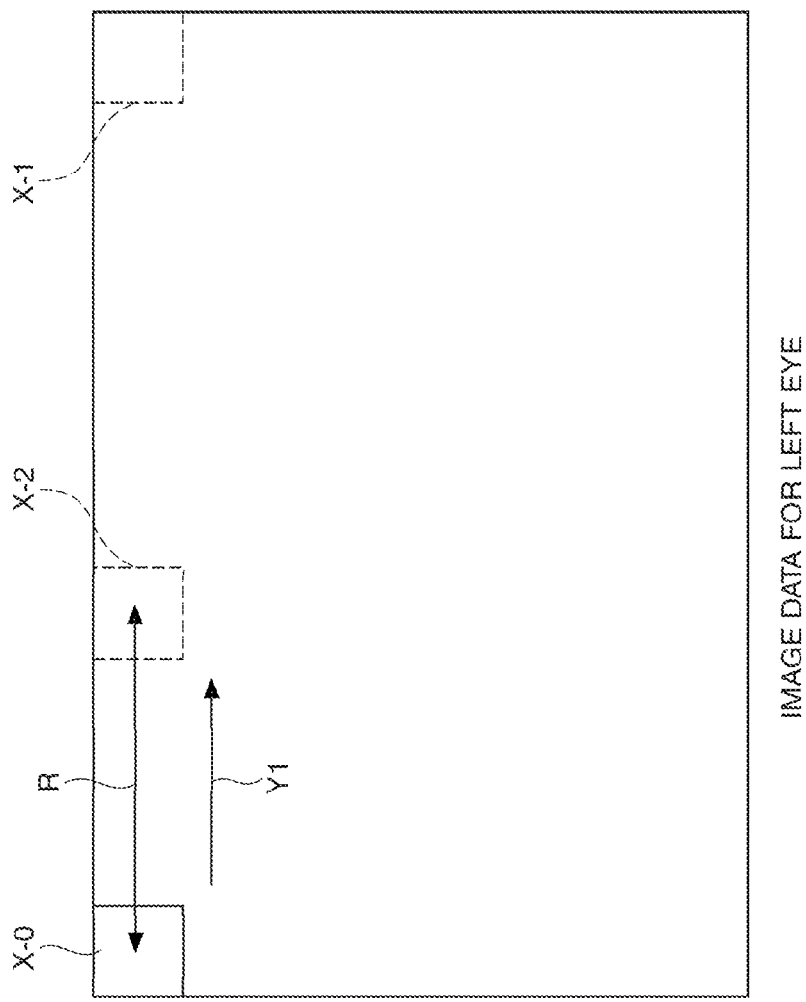
FIG. 10 is a schematic view showing the image data for the left eye.

FIG. 10 is a view used to explain the operation in step S34, and schematically shows the image data for the left eye expanded in a predetermined coordinate system.

In step S34, first, the parallax value calculating section 32 disposes the reference region image data acquired in step S33 in the predetermined coordinate system in which the image data for the left eye is expanded. In this case, the parallax value calculating section 32 disposes the reference region image data at the arrangement position of the reference region image data in the image data for the right eye, in the predetermined coordinate system. For example, FIG. 10 may be referred to. Here, when the reference region image data acquired in step S33 is reference region image data corresponding to the reference region 200-1 (refer to FIG. 8), the parallax value calculating section 32 disposes the reference region image data at the position (position corresponding to the region X-0 in FIG. 10) of the reference region 200-1 in the image data for the right eye in the predetermined coordinate system in which the image data for the left eye is expanded.

Then, the parallax value calculating section 32 calculates the similarity between the reference region image data and the image data of the image data for the left eye in a region where the reference region image data is disposed. In the present embodiment, the similarity is a value in a range of −1 to 1 calculated using a normalized correlation function. The similarity increases as the value becomes close to 1.

Then, the parallax value calculating section 32 shifts the reference region image data as a template image by one pixel rightward (direction indicated by the arrow Y1 in FIG. 10) in the coordinate system, in which the image data for the left eye is expanded, and calculates the similarity between the reference region image data and the image data of the image data for the left eye in the region where the reference region image data is disposed in the same manner as in the method described above.

In this way, the parallax value calculating section 32 repeats an operation of shifting the reference region image data by one pixel rightward and then calculating the similarity between the reference region image data and the image data for the left eye in a region where the reference region image data is located until the reference region image data reaches the right end of the image data for the left eye. For example, referring to FIG. 10, the parallax value calculating section 32 repeats the above-described operation until the reference region image data reaches a region X-1 when the reference region image data acquired in step S33 is reference region image data corresponding to the reference region 200-1 (refer to FIG. 8).

Then, the parallax value calculating section 32 compares the calculated similarities, specifies a region with highest similarity among the regions in which the similarities are to be calculated in the image data for the left eye, and acquires the coordinates which define the region. For example, FIG. 10 is referred to. Here, when the reference region image data acquired in step S33 is reference region image data corresponding to the reference region 200-1 (refer to FIG. 8), the parallax value calculating section 32 acquires the coordinates which define a region X-2 if the similarity between the reference region image data and the image data for the left eye corresponding to the region X-2 is highest.

In this way, the parallax value calculating section 32 acquires the coordinates of a region, in which the image data corresponding to the reference region image data acquired in step S33 is located, in the image data for the left eye in step S34.

Here, as described using FIGS. 4 and 5, for the image data of an image related to one certain object, the position where the image data of the image is disposed in the image data for the right eye and the position where the image data of the image is disposed in the image data for the left eye are shifted from each other by the amount of separation R which reflects parallax.

In addition, the reference region image data and the image data corresponding to the region of the image data for the left eye specified in step S34 are image data with highest similarity, that is, image data indicating most "similar" images. These are image data formed by shifting images, which are related to the same object, from each other by the amount of separation R which reflects parallax.

In the present embodiment, a similarity using a normalized correlation function is adopted. The reason is as follows. Even in the image data related to the same object, the content of the image data for the right eye and the content of the image data for the left eye are different in order to reflect the parallax between left and right eyes (in order to reflect a difference between visibility when viewing the object with the right eye and visibility when viewing the object with the left eye). In consideration of this, a region corresponding to the reference region image data is appropriately detected from the point of view of similarity. In addition, detection of the region where the image data corresponding to the reference region image data is located is not limited to the method which uses the similarity using a normalized correlation function. For example, it is also possible to binarize the reference region image data while binarizing the image data for the left eye and to perform template matching processing using these image data.

In addition, in the present embodiment, detection of a region corresponding to the reference region is executed by repeating the operation of shifting the reference region image data by one pixel "rightward" and then calculating the similarity between the reference region image data and the image data for the left eye until the reference region image data reaches the right end of the image data for the left eye. The reason will be described below with reference to FIGS. 4 and 5. Assuming that all objects are located further forward than the reference plane in a virtual space as in the present embodiment, the position of an image related to one object in the image data for the right eye of the image data is necessarily the "left" of the position of the image, which is related to the one object in the image data for the left eye of the image data, in the horizontal direction (direction corresponding to the extending direction of a straight line connecting the left and right eyes to each other), as shown in FIG. 5. Accordingly, since it is possible to prevent calculating the similarity unnecessarily by detecting a region corresponding to the reference region 200 through the operation described above, the processing efficiency can be improved.

Referring back to FIG. 9, the parallax value calculating section 32 calculates the amount of separation R which is a distance between the coordinates of the center of the region, in which the reference region image data is disposed in the image data for the right eye, and the coordinates of the center of the region with highest similarity in the image data for the left eye (step S35). Referring to FIG. 10, assuming that the image data in the region X-2 is most similar to the reference region image data, the parallax value calculating section 32 calculates a distance between the center of the region X-2 and the center of the region corresponding to the reference region 200-1 as the amount of separation R.

Then, the parallax value calculating section 32 calculates the calculated amount of separation R, as it is, as a parallax value of the reference region 200 to be processed in step S33 (step S36). That is, in the present embodiment, the parallax value is equal to the amount of separation R. In addition, although the amount of separation R is set as a parallax value as it is in the present embodiment, it is preferable that the parallax value be positively correlated with the amount of separation R. That is, since the parallax value is positively correlated with the amount of separation R, a value positively correlated with the size of parallax is preferable as the parallax value.

The parallax value calculating section 32 calculates the parallax values of all reference regions 200 by performing the processing, which is related to steps S33 to S36, on all reference regions 200 formed in the image data for the right eye.

After calculating the parallax values of all reference regions 200 formed in the image data for the right eye as described above, the parallax value calculating section 32 outputs the information indicating the parallax values of all reference regions 200 to the output feature value calculating section 33 (step S37).

Figure 11:
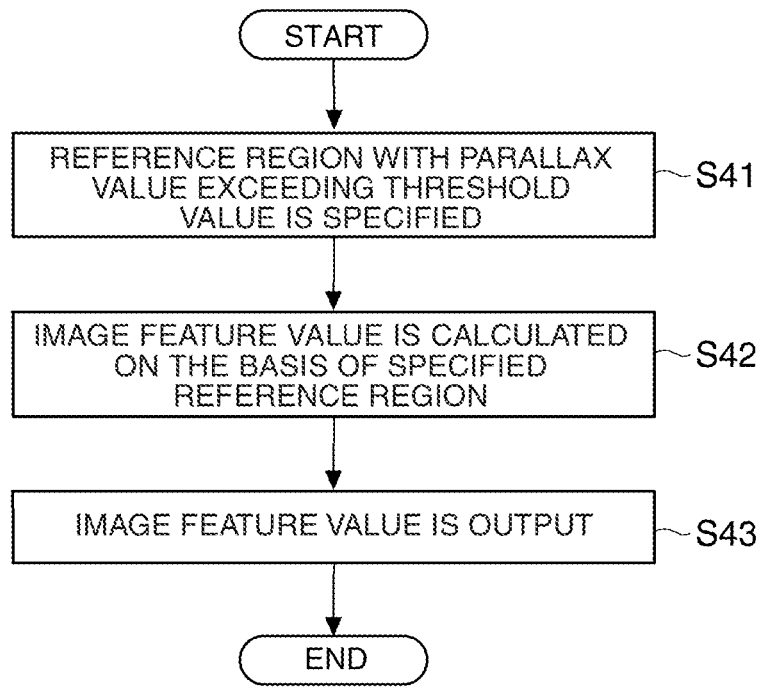
FIG. 11 is a flow chart showing the operation of an output feature value calculating section.

FIG. 11 is a flow chart showing the operation of the output feature value calculating section 33.

The output feature value calculating section 33 specifies the reference region 200 with a parallax value exceeding a predetermined threshold value, among the reference regions 200, on the basis of the information input from the parallax value calculating section 32 (step S41). Hereinafter, the reference region 200 specified in step S41 is called a "specified reference region 200".

Then, the output feature value calculating section 33 calculates an output white peak value, an output APL, an output black peak value, and an output brightness histogram as image feature values on the basis of the image data included in the specified reference region 200 in the image data for the right eye (step S42).

Specifically, in the image data for the right eye, the output feature value calculating section 33 sets a maximum value of the representative brightness values of the specified reference regions 200 as the output white peak value, a minimum value of the representative brightness values of the specified reference regions 200 as the output black peak value, and an average value of the representative brightness values of the specified reference region 200 as an output APL. In addition, the output feature value calculating section 33 generates a brightness histogram from the distribution of the representative brightness values of the specified reference regions 200.

Then, the output feature value calculating section 33 outputs the calculated various image feature values to the brightness expanding rate calculating section 40 and the light reduction rate calculating section 60.

Thus, in the present embodiment, the output feature value calculating section 33 uses the information regarding the brightness of the image data included in the reference region 200 with a parallax value exceeding the predetermined threshold value when calculating various image feature values but does not use the information regarding the brightness of the image data included in the reference region 200 with a parallax value lower than the predetermined threshold value. That is, the calculated image feature value reflects the information regarding the image data corresponding to the reference region 200 with a parallax value exceeding the predetermined threshold value but does not reflect the information regarding the image data corresponding to the reference region 200 with a parallax value lower than the predetermined threshold value. This is based on the following reasons.

That is, a mixed 3D image expressed by the image data for the right eye and the image data for the left eye may be formed by a background image showing the background as infinity and an image expressed with a certain degree of three-dimensional effect on the background image. In this case, the image expressed with a certain degree of three-dimensional effect tends to be important rather than the background image. Accordingly, when performing brightness expanding processing on the image data, it is necessary to perform the brightness expanding processing on the basis of a brightness expanding rate suitable for the image data related to the image expressed with a three-dimensional effect.

According to the present embodiment, the output feature value calculating section 33 calculates various image feature values on the basis of the information regarding the reference region 200 which is most probably not a region related to the background image but a region related to the image to be expressed with a certain degree of three-dimensional effect because the parallax value exceeds a predetermined threshold value. For this reason, the brightness expanding rate calculated on the basis of the calculated image feature values becomes a value calculated on the basis of the reference region 200 related to an image excluding the background image, that is, a value suitable for the image data related to an image expressed with a certain degree of three-dimensional effect which is not a background image.

In addition, the predetermined threshold value is appropriately set in advance through simulations and tests from a point of view in which the predetermined threshold value is a reference for distinguishing a background image from an image expressed with a certain degree of three-dimensional effect.

As described above, the image display device 1 according to the present embodiment includes: the feature value calculating section 30 which calculates an image feature value related to the brightness of image data such that the parallax between the image data for the right eye and the image data for the left eye which form the 3D image data is reflected; the brightness expanding rate calculating section 40 which calculates a brightness expanding rate, which is related to brightness expanding processing performed on the image data for the right eye and the image data for the left eye, on the basis of the image feature value calculated by the feature value calculating section 30; and the brightness expanding processing section 50 which performs brightness expanding processing on the image data for the right eye and the image data for the left eye on the basis of the brightness expanding rate calculated by the brightness expanding rate calculating section 40.

As described above, the feature value calculating section 30 calculates the image feature value related to the brightness of image data such that the parallax between the image data for the right eye and the image data for the left eye is reflected, and the brightness expanding rate calculating section 40 calculates the brightness expanding rate on the basis of the image feature value calculated such that the parallax is reflected. Since the brightness expanding rate is calculated in this way, the value of the brightness expanding rate becomes a value in which the parallax between the image data for the right eye and the image data for the left eye is reflected. In addition, since the brightness expanding processing section 50 performs the brightness expanding processing on the image data for the right eye and the image data for the left eye on the basis of the calculated brightness expanding rate, it is possible to perform effective brightness expanding processing which reflects parallax.

Moreover, in the present embodiment, the feature value calculating section 30 detects the amount of separation R between each reference region 200, which is formed by dividing the image data for the right eye of the image data for the right eye and the image data for the left eye, and a region corresponding to each reference region 200 in the image data for the left eye, calculates a parallax value which is positively correlated with the detected amount of separation R, and calculates the image feature value using the calculated parallax value.

As described above, the feature value calculating section 30 calculates the parallax value positively correlated with the amount of separation R and calculates the image feature value using the calculated parallax value. In addition, the parallax value used when calculating the image feature value is positively correlated with the amount of separation R and is also positively correlated with the size of parallax in one reference region 200. Accordingly, by calculating the image feature value using the parallax value, it is possible to calculate the image feature value which reflects parallax (size of parallax) appropriately.

In addition, in the present embodiment, the output feature value calculating section 33 of the feature value calculating section 30 uses the reference region 200 with a parallax value exceeding a predetermined threshold value when calculating various image feature values but does not use the reference region 200 with a parallax value lower than the predetermined threshold value. That is, the calculated image feature value reflects the information regarding the image data corresponding to the reference region 200 with a parallax value exceeding the predetermined threshold value but does not reflect the information regarding the image data corresponding to the reference region 200 with a parallax value lower than the predetermined threshold value. This is based on the following reasons.

That is, a mixed 3D image expressed by the image data for the right eye and the image data for the left eye may be formed by a background image showing the background as infinity and an image expressed with a certain degree of three-dimensional effect on the background image. In this case, the image expressed with a certain degree of three-dimensional effect tends to be important rather than the background image. Accordingly, when performing brightness expanding processing on the image data, it is necessary to perform the brightness expanding processing on the basis of a brightness expanding rate suitable for the image data related to the image expressed with a three-dimensional effect.

According to the present embodiment, the output feature value calculating section 33 calculates various image feature values on the basis of the information regarding the reference region 200 which is most probably not a region related to the background image but a region related to the image to be expressed with a certain degree of three-dimensional effect because the parallax value exceeds a predetermined threshold value. For this reason, the brightness expanding rate calculated on the basis of the calculated image feature values becomes a value calculated on the basis of the reference region 200 related to an image excluding the background image, that is, a value suitable for the image data related to an image expressed with a three-dimensional effect which is not a background image.

In addition, in the present embodiment, the light modulation element 120 is provided which modulates light emitted from the light source 110 corresponding to the brightness expanding processing of the brightness expanding processing section 50.

Accordingly, for an image projected on the screen 5, it is possible to improve the contrast sensitivity by expanding the dynamic range of the image while maintaining the apparent brightness of the image.

Second Embodiment

Then, a second embodiment will be described.

In the present embodiment, a method of calculating the output white peak value, the output APL, the output black peak value, and the output brightness histogram using the feature value calculating section 30 is different from that in the first embodiment described above.

In the first embodiment described above, the feature value calculating section 30 specifies the reference region 200 with a parallax value exceeding a predetermined threshold value among the reference regions 200 formed by dividing the image data for the right eye and calculates the output white peak value, the output APL, the output black peak value, and the output brightness histogram on the basis of the image data for the right eye included in these reference regions 200.

On the other hand, in the present embodiment, the feature value calculating section 30 calculates a white peak value, an APL, a black peak value, and a brightness histogram first on the basis of the image data for the right eye corresponding to the reference region 200 with a predetermined parallax value using the same method as in the first embodiment. For convenience of explanation, the various image feature values calculated herein are called a right white peak value, a right APL, a right black peak value, and a right brightness histogram.

In addition, the feature value calculating section 30 divides the image data for the left eye into the reference regions 200 and calculates the parallax values of these reference regions 200, specifies the reference region 200 with a parallax value exceeding the predetermined threshold value, and calculates the white peak value, the APL, the black peak value, and the brightness histogram on the basis of the image data for the left eye corresponding to the specified reference region 200. Calculation of the parallax value of the reference region 200 formed by dividing the image data for the left eye is performed using the same method as for calculation of the parallax value of the reference region 200 formed by dividing the image data for the right eye. For convenience of explanation, the various image feature values calculated herein are called a left white peak value, a left APL, a left black peak value, and a left brightness histogram.

Then, the feature value calculating section 30 calculates the output white peak value, the output APL, the output black peak value, and the output brightness histogram as follows.

(A) Output White Peak Value

The representative value of the output white peak value is assumed to be a larger value, that is, a brighter value of the right white peak value and the left white peak value. This can be expressed by the following Expression (1).

$$WP_O = \text{Max}(WP_R, WP_L) \qquad (1)$$

Here, $WP_O$, $WP_R$, and $WP_L$ indicate an output white peak value, a right white peak value, and a left white peak value, respectively.

This is because setting the brightness of a portion, which has a highest brightness, in the image data as a reference is suitable in light modulation processing. For example, when the smaller one of the right white peak value and the left white peak value is set as the output white peak value, a portion with a highest brightness in the image data for the right eye or the image data for the left eye may be overexposed due to the brightness expanding.

(B) Output APL

The representative value of the output APL is assumed to be an average value of the right APL and the left APL. This can be expressed by the following Expression (2).

$$APL_O = \text{Avg}(APL_R, APL_L) \qquad (2)$$

Here, $APL_O$, $APL_R$, and $APL_L$ indicate an output APL, a right APL, and a left APL, respectively.

Since the APL is essentially an average value of the brightness, calculating the average value is also appropriate for the APLs of two items of the image data.

(C) Output Black Peak Value

The representative value of the output black peak value is assumed to be a smaller one of the right black peak value and the left black peak value, that is, a value of the darker one. This can be expressed by the following Expression (3).

$$BP_O = \text{Min}(BP_R, BP_L) \qquad (3)$$

Here, $BP_O$, $BP_R$, and $BP_L$ indicate an output black peak value, a right black peak value, and a left black peak value, respectively.

The output black peak value is the brightness of a portion with a smallest brightness in image data. Accordingly, if there are two target items of image data, adopting the brightness of the darkest portion in these two images as a representative value is appropriate as brightness expanding processing suitable for the contrast of the image data can be performed.

(D) Brightness Histogram

The output brightness histogram is assumed to be an average of a right brightness histogram and a left brightness histogram. This can be expressed by the following Expression (4).

$$\text{Hist}_O(X) = \{\text{Hist}_R(X) + \text{Hist}_L(X)\}/2 \quad (4)$$

Here, $\text{Hist}_O(X)$, $\text{Hist}_R(X)$, and $\text{Hist}_L(X)$ indicate an output brightness histogram, a right brightness histogram, and a left brightness histogram, respectively. In the case of image data with a gradation value of 10 bits, X=0 to 1023.

According to Expression (4), the average value of each class of the brightness becomes a representative value.

By calculating various image feature values in this manner, not only the parallax between the reference regions 200 in the image data for the right eye but also the parallax between the reference regions 200 in the image data for the left eye can be reflected in the image feature value. As a result, it becomes possible to perform effective brightness expanding processing which reflects the parallax between the image data for the right eye and the image data for the left eye.

Third Embodiment

In the present embodiment, a method of calculating the output white peak value and the output APL among various kinds of image feature values calculated by the output feature value calculating section 33 of the feature value calculating section 30 is different from that in the first embodiment described above. Hereinafter, a method of calculating each of the output white peak value and the output APL using the output feature value calculating section 33 of the present embodiment will be described.

(A) Output White Peak Value

On the basis of the representative brightness value of the reference region 200 input from the reference region brightness information calculating section 31 and the parallax value of the reference region 200 input from the parallax value calculating section 32, the output feature value calculating section 33 calculates a determination value by performing multiplication of the representative brightness value and the parallax value for each reference region 200 formed by dividing the image data for the right eye. That is, "determination value=representative brightness value×parallax value".

Then, the output feature value calculating section 33 compares the calculated determination values, and specifies the largest determination value and also specifies the reference region 200 with this determination value.

Then, the output feature value calculating section 33 sets the representative brightness value of the specified reference region 200 as an output white peak value.

The following effects can be achieved by calculating the output white peak value as described above.

That is, since the parallax value is a value which is positively correlated with the size of parallax as described above, the parallax value increases as parallax increases and decreases as parallax decreases. Therefore, the parallax value by which the representative brightness value is multiplied in order to calculate a determination value functions as a "weighting" which increases the determination value in proportion to parallax. In addition, by calculating the determination value by multiplication of the representative brightness value and the parallax value for each reference region 200 and setting the representative brightness value of the reference region 200 with the largest determination value as an output white peak value, it is possible to select the representative brightness value as the output white peak value which reflects the size of parallax appropriately.

Here, in a mixed 3D image expressed by the image data for the right eye and the image data for the left eye, an image related to an object expressed so as to be present further forward (image with larger parallax) tends to be a more important image in which a three-dimensional effect or activeness is emphasized. Accordingly, when calculating the output white peak value as an image feature value, it is necessary to reflect the information regarding a region showing the image, which is related to the object expressed so as to be present further forward, on the calculated output white peak value. In this case, it is possible to appropriately meet this need by selecting the representative brightness value as the output white peak value using the determination value, which is obtained by using the parallax value of the reference region 200 as a "weighting", as described above.

In addition, when calculating the determination value, the representative brightness value may be multiplied by the parallax value after appropriate correction in consideration of the degree of reflection of the parallax value on the determination value.

(B) Output APL

The output feature value calculating section 33 does not calculate an arithmetic mean of the representative brightness values of the reference regions 200, but calculates a weighted average of the representative brightness values, which are obtained by giving as a "weighting" the parallax value in each reference region 200 formed by dividing the image data for the right eye, on the basis of the representative brightness value of the reference region 200 input from the reference region brightness information calculating section 31 and the parallax value of the reference region 200 input from the parallax value calculating section 32 and sets the calculated value as the output APL. More specifically, the output feature value calculating section 33 calculates the output APL for each reference region 200 by performing multiplication of the representative brightness value and the parallax value for each reference region 200, calculating the sum, and dividing the calculated sum by the sum of parallax values (sum of weightings).

The following effects can be achieved by calculating the output APL as described above.

That is, since the parallax value is a value which is positively correlated with the size of parallax as described above, the parallax value increases as parallax increases and decreases as parallax decreases. By calculating the output APL using a weighted average obtained by giving the parallax value as a "weighting" instead of calculating the output APL using the arithmetic mean of the representative brightness values, it is possible to calculate the output APL which reflects the size of parallax appropriately.

As described above, in a mixed 3D image expressed by the image data for the right eye and the image data for the left eye, an image related to an object expressed so as to be present further forward (image with larger parallax) tends to be a more important image in which a three-dimensional effect or activeness is emphasized. Accordingly, when calculating the output APL as an image feature value, it is necessary to reflect the information regarding a region showing the image, which is related to the object expressed so as to be present further forward, on the value of the calculated output APL. In this case, it is possible to appropriately meet this need by calculating the output APL using a weighted average obtained by giving the parallax value as a "weighting" as described above.

Fourth Embodiment

The present embodiment is a modification of the third embodiment described above.

In the present embodiment, the output white peak value and the output APL are calculated as follows.

When calculating the output white peak value, the output feature value calculating section 33 calculates a white peak value of the image data for the right eye (referred to as a "right white peak value") first using the determination value calculated by multiplication of the representative brightness value and the parallax value by the same method as in the third embodiment described above. In addition, the output feature value calculating section 33 calculates a white peak value of the image data for the left eye (referred to as a "left white peak value") using the determination value by the same method.

Then, the output feature value calculating section 33 sets a larger value, that is, a brighter value of the right white peak value and the left white peak value as an output white peak value.

In addition, when calculating the output APL, the output feature value calculating section 33 calculates an APL of the image data for the right eye (referred to as a "right APL") first using the weighted average, which is obtained by giving the parallax value as a "weighting", by the same method as in the third embodiment described above. Then, the output feature value calculating section 33 calculates an APL of the image data for the left eye (referred to as a "left APL") using the weighted average, which is obtained by giving the parallax value as a "weighting", by the same method.

Then, the output feature value calculating section 33 sets the average of these right APL and left APL as an output APL.

By calculating the output white peak value and the output APL in this manner, not only the parallax between the reference regions 200 in the image data for the right eye but also the parallax between the reference regions 200 in the image data for the left eye can be reflected in the image feature value. As a result, it becomes possible to perform effective brightness expanding processing which reflects the parallax between the image data for the right eye and the image data for the left eye.

Fifth Embodiment

In the present embodiment, a method of calculating the output white peak value and the output APL among various kinds of image feature values calculated by the output feature value calculating section 33 of the feature value calculating section 30 is different from that in the first embodiment described above.

First, the feature value calculating section 30 acquires upper and lower limits of the parallax value on the basis of the representative brightness value of the reference region 200 of the image data for the right eye input from the reference region brightness information calculating section 31 and the parallax value of the reference region 200 of the image data for the right eye input from the parallax value calculating section 32 and divides the upper and lower limits every predetermined range. Then, the feature value calculating section 30 detects the number of reference regions 200 with a parallax value of each range for each divided range. For example, the feature value calculating section 30 detects that the number of reference regions 200 satisfying value A1≤parallax value<value A2 is 20 and the number of reference regions 200 satisfying value A2≤parallax value<value A3 is 15. Then, on the basis of the detection result, the feature value calculating section 30 generates a histogram having the parallax value, which is divided to fall within a predetermined range, as a class and the number (frequency) of reference regions 200, which have a parallax value within the range, as a frequency. By referring to the histogram generated herein, it is possible to detect, for one reference region 200, how many reference regions 200 with a parallax value belonging to the same range as the parallax value of the one reference region 200 are present in the image data for the right eye. That is, the frequency of the reference region 200 having almost the same parallax value in the image data for the right eye can be detected for each reference region 200 by referring to the histogram.

After generating the histogram as described above, the feature value calculating section 30 calculates the output white peak value and the output APL as follows.

In addition, in the following explanation, the "frequency of the parallax value of the reference region 200" refers to the number of reference regions 200 having a parallax value belonging to the same range as the parallax value of the reference region 200 among the reference regions 200 formed by dividing the image data for the right eye.

(A) Output White Peak Value

On the basis of the representative brightness value of the reference region 200 input from the reference region brightness information calculating section 31 and the parallax value of the reference region 200 input from the parallax value calculating section 32, the output feature value calculating section 33 calculates a determination value by performing multiplication of the representative brightness value and a "value obtained by dividing the frequency of the parallax value by the total number of reference regions 200" for each reference region 200 formed by dividing the image data for the right eye. That is, "determination value=representative brightness value×(frequency of parallax value/total number of reference regions 200)".

Then, the output feature value calculating section 33 compares the calculated determination values, and specifies the largest determination value and also specifies the reference region 200 with this determination value.

Then, the output feature value calculating section 33 sets the representative brightness value of the specified reference region 200 as an output white peak value.

The following effects can be achieved by calculating the output white peak value as described above.

That is, in the expression "determination value=representative brightness value×(frequency of parallax value/total number of reference regions 200)" for calculating the determination value, a part "frequency of parallax value/total number of reference regions 200" functions as a "weighting" which increases the determination value in proportion to the frequency of the reference region 200 having almost the same parallax value. In addition, by calculating the determination value using the above Expression and setting the representative brightness value of the reference region 200 with the largest determination value as an output white peak value, it is possible to calculate the output white peak value which reflects the frequency of parallax appropriately.

Here, in a 3D image expressed by the image data for the right eye and the image data for the left eye, an image related to an object, which has a large number of objects expressed such that the positions in a depth direction are almost the same compared with other objects, tends to be an important image in the 3D image. Accordingly, when calculating the output white peak value, it is necessary to reflect the information regarding the reference region 200, which shows the image related to such an object, on the calculated output white peak value. Here, since the parallax value is a value corresponding to the size of parallax as described above, each reference region 200 showing an image related to the object in which the position in a depth direction is almost equal has almost the same parallax value. Therefore, it is possible to appropriately meet the above need by calculating the output white peak value using the determination value calculated on the basis of the above Expression.

(B) Output APL

The output feature value calculating section 33 does not calculate an arithmetic mean of the representative brightness values of the reference regions 200, but calculates a weighted average of the representative brightness values, which are obtained by giving as a "weighting" the value corresponding to the frequency of the parallax value in each reference region 200 formed by dividing the image data for the right eye, on the basis of the representative brightness value of the reference region 200 input from the reference region brightness information calculating section 31 and the parallax value of the reference region 200 input from the parallax value calculating section 32 and sets the calculated value as the output APL. More specifically, the output feature value calculating section 33 calculates the output APL for each reference region 200 by performing multiplication of the representative brightness value and the "frequency of parallax value/total number of reference regions 200" (=weighting), calculating the sum, and dividing the calculated sum by the sum of "frequency of parallax value/total number of reference regions 200" (sum of weightings).

The following effects can be achieved by calculating the output APL as described above.

That is, by calculating the output APL using the weighted average obtained by giving the "frequency of parallax value/total number of reference regions 200" as a "weighting", it is possible to calculate the output white peak value which reflects the frequency of parallax appropriately.

Here, in a mixed 3D image expressed by the image data for the right eye and the image data for the left eye, an image related to an object, which has a large number of objects expressed such that the positions in a depth direction are almost the same compared with other objects, tends to be an important image in the 3D image. Accordingly, when calculating the output APL, it is necessary to reflect the information regarding the reference region 200, which shows the image related to such an object, on the value of the calculated APL. Here, since the parallax value is a value corresponding to the size of parallax as described above, each reference region 200 showing an image related to the object in which the position in a depth direction is almost equal has almost the same parallax value. Therefore, it is possible to appropriately meet the above need by calculating the output white peak value using the determination value calculated on the basis of the above Expression.

Sixth Embodiment

The present embodiment is a modification of the fifth embodiment described above.

That is, in the present embodiment, a method of calculating the output white peak value and the output APL is different from that in the first embodiment.

When calculating the output white peak value, the output feature value calculating section 33 calculates a white peak value of the image data for right eye (referred to as a "right white peak value") first using the determination value calculated by multiplication of the representative brightness value and the "frequency of parallax value/total number of reference regions 200" (weighting) by the same method as in the fifth embodiment described above. In addition, the output feature value calculating section 33 calculates a white peak value of the image data for the left eye (referred to as a "left white peak value") using the determination value by the same method.

Then, the output feature value calculating section 33 sets a larger value, that is, a brighter value of the right white peak value and the left white peak value as an output white peak value.

In addition, when calculating the output APL, the output feature value calculating section 33 calculates an APL of the image data for the right eye (referred to as a "right APL") first using the weighted average, which is obtained by giving the "frequency of parallax value/total number of reference regions 200" as a "weighting", by the same method as in the fifth embodiment described above. Then, the output feature value calculating section 33 calculates an APL of the image data for the left eye (referred to as a "left APL") using the weighted average, which is obtained by giving the "frequency of parallax value/total number of reference regions 200" as a "weighting", by the same method.

Then, the output feature value calculating section 33 sets the average of these right APL and left APL as an output APL.

By calculating the output white peak value and the output APL in this manner, not only the parallax between the reference regions 200 in the image data for the right eye but also the parallax between the reference regions 200 in the image data for the left eye can be reflected in the image feature value. As a result, it becomes possible to perform effective brightness expanding processing which reflects the parallax between the image data for the right eye and the image data for the left eye.

Seventh Embodiment

Next, a seventh embodiment will be described.

In the present embodiment, a brightness expanding processing method of the brightness expanding processing section 50 is different from that in the first embodiment described above.

In the first embodiment described above, the brightness expanding processing section 50 performs the brightness expanding processing according to the brightness expanding rate calculated by the brightness expanding rate calculating section 40.

On the other hand, in the present embodiment, the brightness expanding processing section 50 performs brightness expanding processing on the image data on the basis of parallax between the image data for the right eye and the image data for the left eye and the brightness expanding rate calculated by the brightness expanding rate calculating section 40.

Moreover, in the first embodiment described above, the feature value calculating section 30 calculates the image feature value related to the brightness of image data while reflecting the parallax between the image data for the right eye and the image data for the left eye.

On the other hand, in the present embodiment, the feature value calculating section 30 may calculate the image feature value related to the brightness of image data while reflecting the parallax between the image data for the right eye and the image data for the left eye, or may calculate the image feature value without reflecting the parallax.

Figure 12:
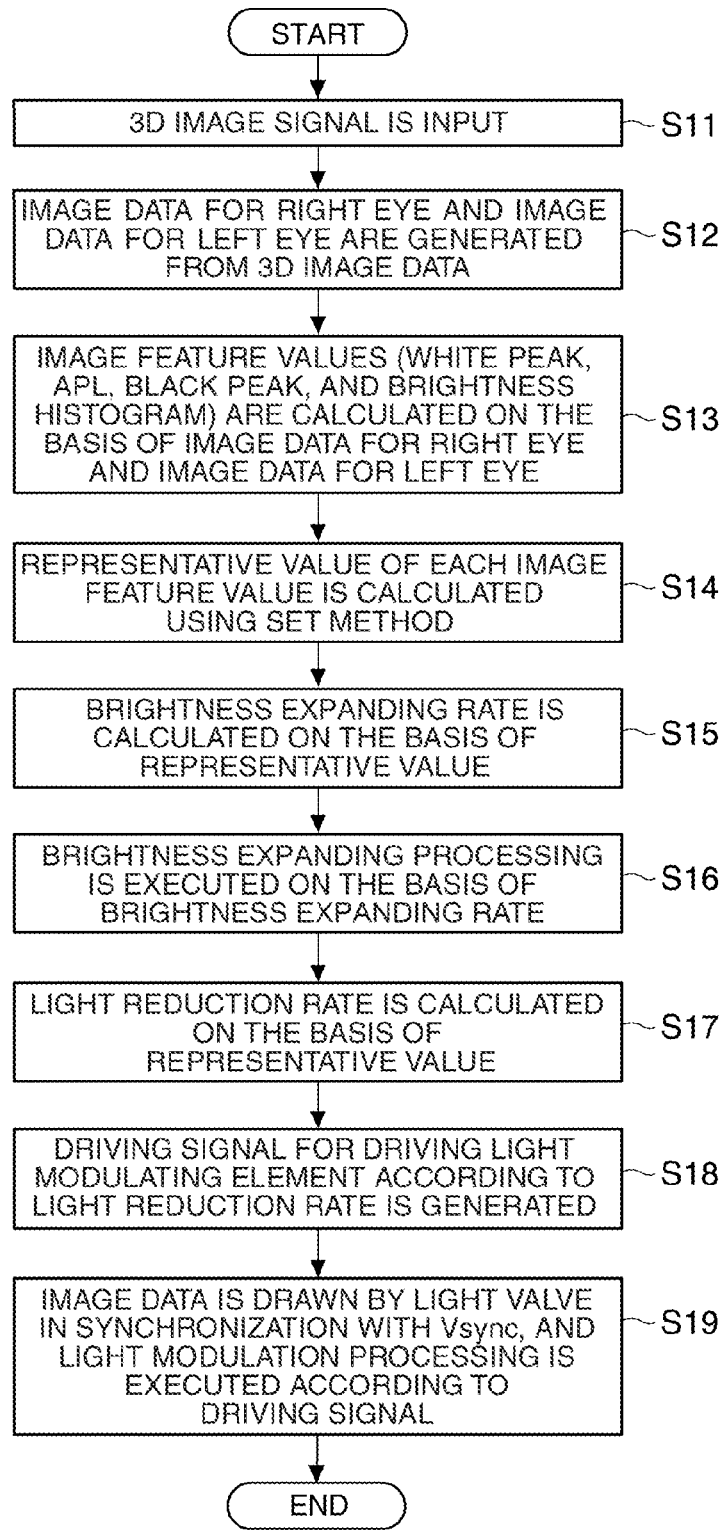
FIG. 12 is a flow chart showing the operation of the image display device according to a seventh embodiment.

FIG. 12 is a flow chart showing the operation of the image display device 1, and shows the procedure in adaptive light control processing executed by each section of the image display device 1 according to the present embodiment. Hereinafter, the adaptive light control processing will be described in detail with reference to the flow chart in FIG. 12.

When a 3D image signal is input (step S11), the image input section 20 generates the image data for the right eye and the image data for the left eye from the input 3D image signal and outputs them to the feature value calculating section 30 and the brightness expanding processing section 50 in the input order (step S12).

The image data for the right eye and the image data for the left eye, the RL identification signal, and the vertical synchronization signal VSync, which are output from the image input section 20, are input to the feature value calculating section 30. The feature value calculating section 30 identifies whether the image data, which is being input from the image input section 20, is the image data for the right eye or the image data for the left eye on the basis of the RL identification signal and the vertical synchronization signal VSync and acquires the image data for the right eye and the image data for the left eye. Then, the feature value calculating section 30 calculates the image feature value for each of the acquired image data (step S13). Examples of the image feature value calculated by the feature value calculating section 30 include a maximum brightness value (white peak value WP), an APL (Average Picture Level), a minimum brightness value (black peak value BP), and a brightness histogram of the entire image data. The feature value calculating section 30 outputs the calculated image feature value to the brightness expanding rate calculating section 40 and the light reduction rate calculating section 60.

For example, the feature value calculating section 30 divides the image data for the right eye of 1920 pixels×1080 pixels, which is to be processed, into 144 pixel blocks 200-1 to 200-144 of 16 blocks (horizontally)×9 blocks (vertically), as shown in FIG. 8. The size of each of the pixel blocks 200-1 to 200-144 is 120 pixels in the vertical direction and 120 pixels in the horizontal direction. In addition, the feature value calculating section 30 calculates the image feature value for each of the image data for the right eye and the image data for the left eye using the same method as in the first embodiment. In addition, since the size and the resolution of the image data for the right eye are the same as those of the image data for the left eye, the image data for the right eye and the image data for the left eye are similarly processed.

The feature value calculating section 30 sets the maximum value of the representative brightness values of pixel blocks which form one image data item as the white peak value WP of the image data, the minimum value as the black peak value BP, and the average value of the representative brightness values as the APL. In addition, a brightness histogram is generated from the distribution of the representative brightness values of the pixel blocks of the image data.

For each of the pair of the image data item for the right eye and the image data item for the left eye which forms one 3D image, the feature value calculating section 30 calculates the white peak value WP, the black peak value BP, the APL, and the brightness histogram as described above and then calculates the representative values of the image data for the right eye and the image data for the left eye (step S14). A method of determining the representative value is set in advance for each image feature value. For example, the method described in the second embodiment may be adopted.

Thus, since the feature value calculating section 30 calculates various kinds of image feature values for each of the image data for the right eye and the image data for the left eye and calculates the representative value of the calculated image feature values using a method corresponding to the type or attribute of the image feature value, an optimal value for the brightness expanding processing can be calculated from the image feature values of two image data items. Then, the representative value of the image feature values is output to the brightness expanding rate calculating section 40 and the light reduction rate calculating section 60.

In addition, the feature value calculating section 30 may calculate the image feature values for only some regions of the image data instead of calculating the image feature values for the entire image data described above. For example, when a black area occurs in the periphery of image data from the relationship between the input image data and the display resolution of the light valve 130, it is possible to calculate an image feature value in a region excluding the periphery of the image data or give a weighting such that a pixel block in the middle is more important than a pixel block in the periphery of the image data and to calculate the image feature value reflecting this weighting.

Moreover, in the example described above, a configuration is adopted in which a plurality of image feature values is calculated for each of the image data for the right eye and the image data for the left eye, the representative value of the calculated image feature values is calculated using a method corresponding to the type or attribute of the image feature value, and the calculated representative value is output. However, a configuration may be adopted in which an image feature value of either the image data for the right eye or the image data for the left eye is calculated and the calculated image feature value is output.

Alternatively, it is also possible to set the maximum value of the brightness values of pixels of the entire image data as the white peak value WP of image data and the minimum value as the black peak value BP without dividing the image data into pixel blocks, to set the average value of the brightness values as the APL, and to generate a brightness histogram from the distribution of the brightness values of pixels.

The brightness expanding rate calculating section 40 calculates a brightness expanding rate on the basis of the representative value of the image feature values input from the feature value calculating section 30 (step S15). For example, the same method as in the first embodiment may be adopted as a method of calculating the brightness expanding rate by the brightness expanding rate calculating section 40.

The brightness expanding processing section 50 expands the gradation of the image data for the right eye and the image data for the left eye input from the image input section 20 on the basis of the brightness expanding rate calculated by the brightness expanding rate calculating section 40 (step S16).

The operation of the brightness expanding processing section 50 will be described in detail later.

On the other hand, the light reduction rate calculating section 60 calculates a light reduction rate on the basis of the representative value of the image feature values input from the feature value calculating section 30 (step S17). Similar to the brightness expanding rate described with reference to FIG. 3 in the first embodiment, the light reduction rate can be calculated by referring to an LUT (not shown) in which the light reduction rate is defined corresponding to two or more of the white peak value WP, the APL, and the black peak value BP, for example. That is, the light reduction rate calculating section 60 acquires the light reduction rate which is defined in the LUT corresponding to the white peak value WP, the APL, or the black peak value BP input from the image input section 20. In addition, when the white peak value WP, the APL, or the black peak value BP input from the image input section 20 deviates from the lattice point at which the light reduction rate is defined, the light reduction rate calculating section 60 calculates a light reduction rate by performing an interpolation operation on the basis of light reduction rates defined at the surrounding three or four lattice points. In this way, the light reduction rate calculating section 60 calculates a light reduction rate and outputs the calculated light reduction rate to the light reduction processing section 70. In addition, the light reduction rate calculating section 60 may use a three-dimensional LUT without being limited to the two-dimensional LUT, or calculate the light reduction rate by operation processing based on one or more of the white peak value WP, the black peak value BP, the APL, and the brightness histogram.

Then, the light reduction rate calculating section 60 generates a driving signal for driving the light control element 120 according to the calculated light reduction rate ka and outputs the driving signal to the light reduction processing section 70 (step S18).

Here, by control of the control section 10, the image data subjected to the brightness expanding processing by the brightness expanding processing section 50 is input to the light valve 130 and is drawn in synchronization with the vertical synchronization signal VSync. Moreover, in synchronization with this timing, the light control element 120 is controlled according to the driving signal input from the light reduction rate calculating section 60 by the light reduction processing section 70, such that light control is performed (step S19).

Next, the brightness expanding processing section 50 will be described in detail.

Figure 13:
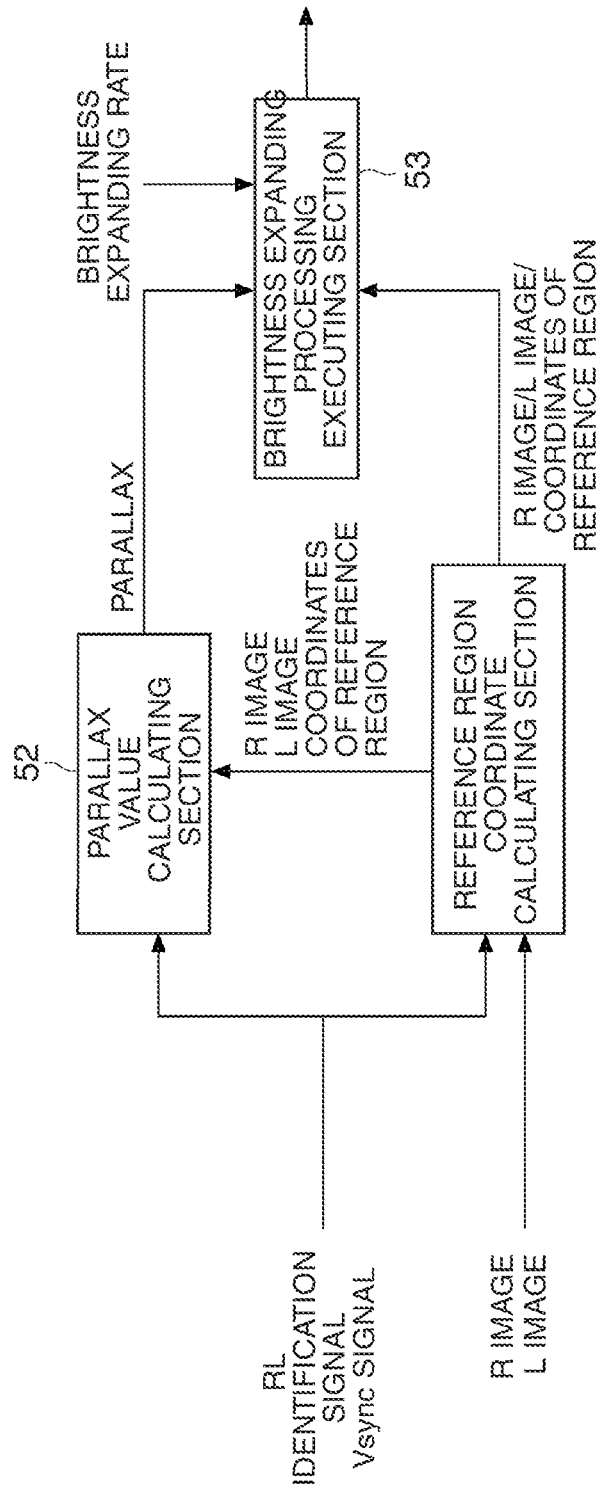
FIG. 13 is a block diagram showing the functional configuration of a brightness expanding processing section.

FIG. 13 is a block diagram showing the functional configuration of the brightness expanding processing section 50.

The brightness expanding processing section 50 expands the gradation of the image data for the right eye and the image data for the left eye input from the image input section 20 on the basis of the brightness expanding rate calculated by the brightness expanding rate calculating section 40. As shown in FIG. 13, the brightness expanding processing section 50 includes a reference region coordinate calculating section 51, a parallax value calculating section 52, and a brightness expanding processing executing section 53.

Figure 14:
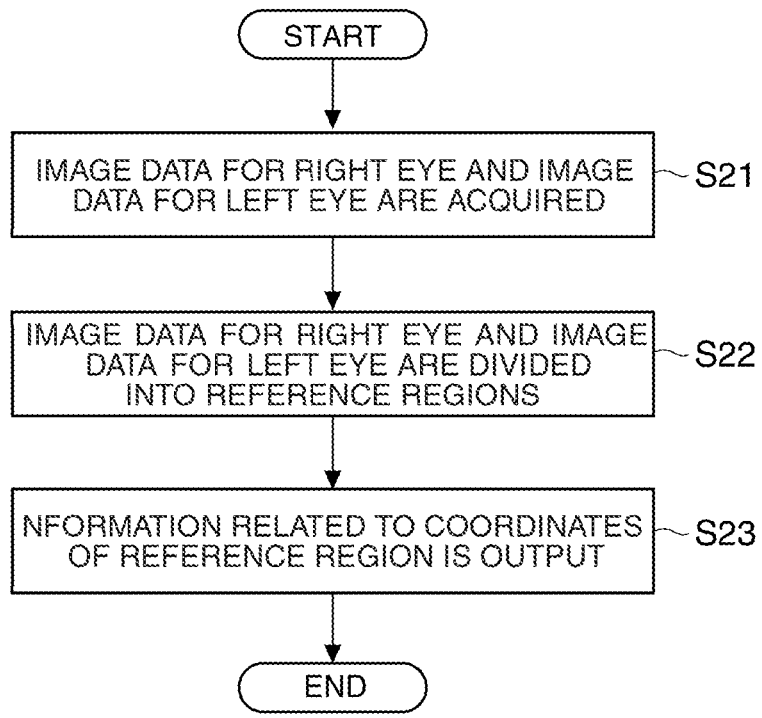
FIG. 14 is a flow chart showing the operation of a reference region coordinate calculating section.

FIG. 14 is a flow chart showing the operation of the reference region coordinate calculating section 51.

First, the reference region coordinate calculating section 51 identifies whether the image data, which is being input from the image input section 20, is the image data for the right eye or the image data for the left eye on the basis of the image data for the right eye, the image data for the left eye, the RL identification signal, and the vertical synchronization signal VSync input from the image input section 20 and acquires the image data for the right eye and the image data for the left eye (step S21).

Then, the reference region coordinate calculating section 51 expands the acquired image data for the right eye and image data for the left eye in a predetermined coordinate system and also divides the image data for the right eye and the image data for the left eye into reference regions 200 (step S22).

Referring to FIG. 8, for example, the reference region coordinate calculating section 51 divides the image data for the right eye and the image data for the left eye of 1920 pixels×1080 pixels into 144 reference regions 200-1 to 200-144 of 16 blocks (horizontally)×9 blocks (vertically), in the same manner as for the pixel block described above. In this case, each size of the reference regions 200-1 to 200-144 is 120 pixels in the vertical direction and 120 pixels in the horizontal direction.

Then, the reference region coordinate calculating section 51 outputs the image data for the right eye, the image data for the left eye, and the information regarding the coordinates which define each reference region 200 to the parallax value calculating section 52 and the brightness expanding processing executing section 53 (step S23).

Figure 15:
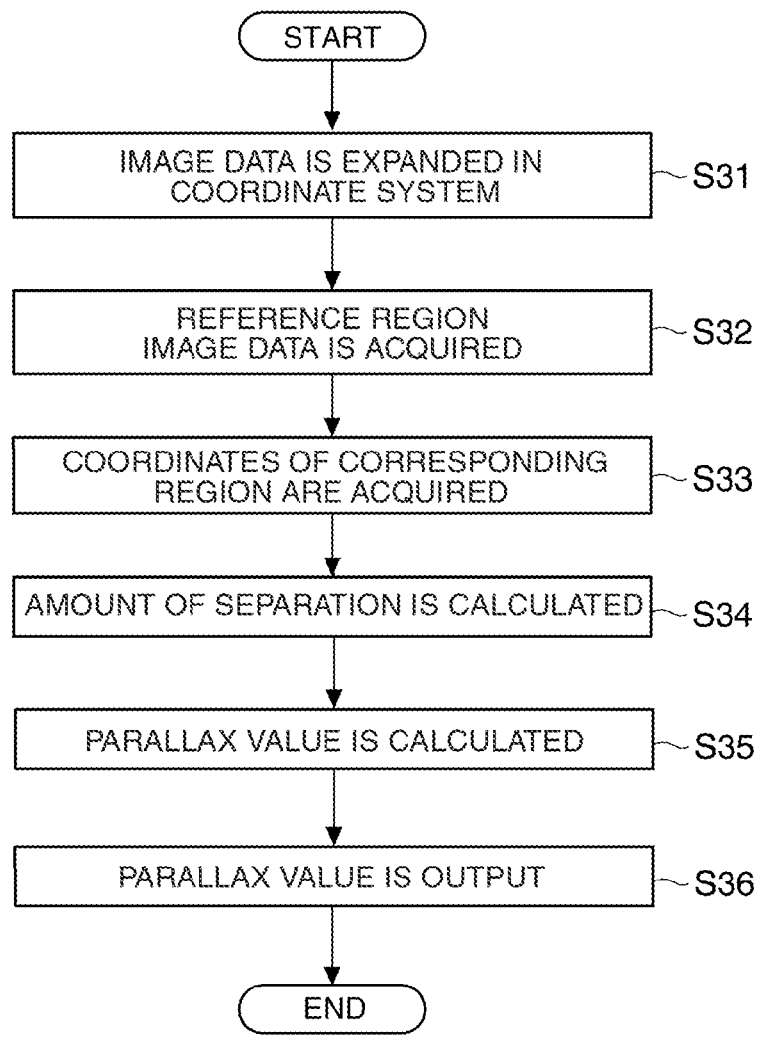
FIG. 15 is a flow chart showing the operation of a parallax value calculating section.

FIG. 15 is a flow chart showing the operation of the parallax value calculating section 52.

The parallax value calculating section 52 expands the image data for the right eye and the image data for the left eye, which have been input from the reference region coordinate calculating section 51, in a predetermined coordinate system (step S31).

Then, the parallax value calculating section 52 specifies one of the reference regions 200, as a reference region to be processed, on the basis of the information regarding the coordinates of the reference region 200 formed by dividing the image data for the right eye input from the reference region coordinate calculating section 51 and acquires the image data corresponding to the reference region 200 (hereinafter, referred to as "reference region image data") specified as the reference region to be processed (step S32). For example, in step S32, the parallax value calculating section 52 acquires the image data (reference region image data) in the region specified by the reference region 200-1 when the reference region 200-1 is set as a reference region to be processed.

Then, the parallax value calculating section 52 acquires the coordinates of a region, in which the image data corresponding to the reference region image data is located, in the image data for the left eye by performing template matching processing on the image data for the left eye using the reference region image data acquired in step S32 as a template image (step S33). The parallax value calculating section 52 can acquire the coordinates of a region, in which the image data corresponding to the reference region image data is located, in the image data for the left eye using the same method as the method described in the first embodiment.

Referring back to FIG. 15, the parallax value calculating section 52 calculates the amount of separation R which is a distance between the coordinates of the center of the region, in which the reference region image data is disposed in the image data for the right eye, and the coordinates of the center of the region, which is most similar to the reference region image data, in the image data for the left eye (step S34). For example, assuming that the region X-2 has highest similarity (refer to FIG. 10), the parallax value calculating section 32 calculates a distance between the center of the region X-2 and the center of the region X-0 as the amount of separation R, in the same manner as in the first embodiment.

Then, the parallax value calculating section 52 calculates the calculated amount of separation R, as it is, as a parallax value of the reference region 200 to be processed in step S32 (step S35). In addition, although the amount of separation R is set as a parallax value as it is in the present embodiment, it is preferable that the parallax value be positively correlated with the amount of separation R. That is, since the parallax value is positively correlated with the amount of separation R, a value positively correlated with the size of parallax is preferable as the parallax value.

The parallax value calculating section 52 calculates the parallax values of all reference regions 200 by performing the processing, which is related to steps S32 to S35, on all reference regions 200 formed in the image data for the right eye.

In addition, the parallax value calculating section 52 calculates the parallax values of all reference regions 200 in the image data for the left eye by performing the processing, which is related to steps S32 to S35, on all reference regions 200 formed in the image data for the left eye. When executing the processing corresponding to step S33, the parallax value calculating section 52 detects a region corresponding to the reference region by repeating an operation of shifting the reference region image data, which is related to the reference region 200 formed in the image data for the left eye, by one pixel leftward in the coordinate system in which the image data for the right eye is expanded and then calculating the similarity between the reference region image data and the image data for the left eye until the reference region image data reaches the left end of the image data for the right eye. As a result, processing efficiency is improved.

After calculating the parallax values of all reference regions 200 formed in the image data for the right eye and the image data for the left eye as described above, the parallax value calculating section 52 outputs the information indicating the parallax values of all reference regions 200 to the brightness expanding processing executing section 53 (step S36).

Figure 16:
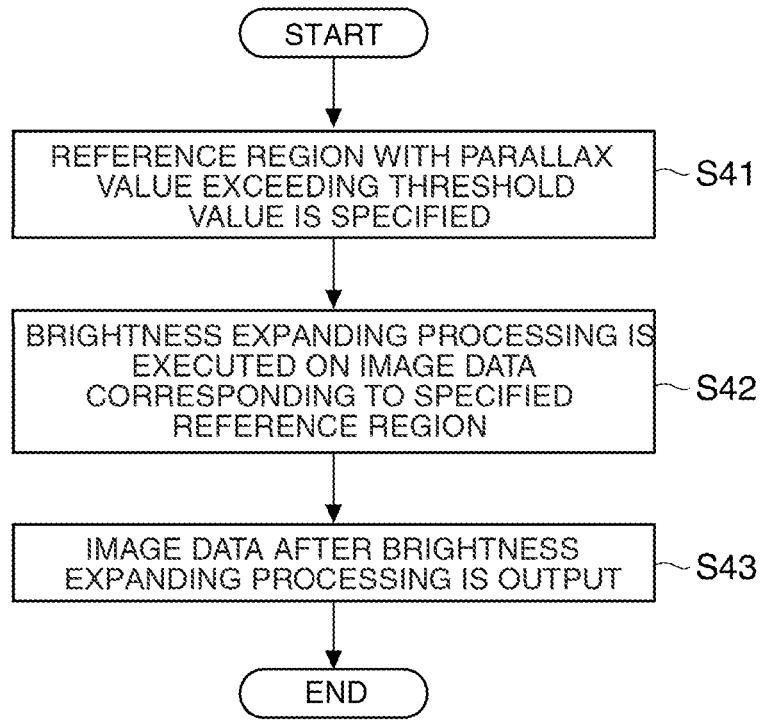
FIG. 16 is a flow chart showing the operation of a brightness expanding processing executing section.

FIG. 16 is a flow chart showing the operation of the brightness expanding processing executing section 53.

The brightness expanding processing executing section 53 specifies the reference region 200 with a parallax value exceeding a predetermined threshold value, among the reference regions 200 formed in the image data for the right eye, on the basis of the information input from the parallax value calculating section 52. Similarly, the brightness expanding processing executing section 53 specifies the reference region 200 with a parallax value exceeding a predetermined threshold value, among the reference regions 200 formed in the image data for the left eye, on the basis of the information input from the parallax value calculating section 52 (step S41).

Then, the brightness expanding processing executing section 53 executes brightness expanding processing on the image data corresponding to (or included in) the reference region 200 (reference region 200 with a parallax value exceeding a predetermined threshold value) specified in step S41, among the image data for the right eye, on the basis of the brightness expanding rate calculated by the brightness expanding rate calculating section 40 and similarly, executes brightness expanding processing on the image data corresponding to the reference region 200 (reference region 200 with a parallax value exceeding a predetermined threshold value) specified in step S41, among the image data for the left eye, on the basis of the brightness expanding rate calculated by the brightness expanding rate calculating section 40 (step S42). Here, assuming that the color information of the image data input from the feature value calculating section 30 to the brightness expanding processing section 50 is R, G, and B, the color information after brightness expanding is R', B', and G', and the brightness expanding rate is kg, the brightness expanding processing is executed such that R'=kg×R, G'=kg×G, and B'=kg×B are realized.

That is, in step S42, the brightness expanding processing section 50 performs brightness expanding processing on the reference region 200 with a parallax value exceeding a predetermined threshold value but does not perform the brightness expanding processing on the reference region 200 with a parallax value lower than the predetermined threshold value for each of the image data for the right eye and the image data for the left eye.

Then, the brightness expanding processing executing section 53 outputs the image data for the right eye and the image data for the left eye after performing the brightness expanding processing alternately to the light valve 130 (step S43).

Thus, in the present embodiment, for each of the image data for the right eye and the image data for the left eye, the brightness expanding processing is performed on the reference region 200 with a parallax value exceeding a predetermined threshold value but is not performed on the reference region 200 with a parallax value lower than the predetermined threshold value. This is based on the following reasons.

That is, a mixed 3D image expressed by the image data for the right eye and the image data for the left eye may be formed by a background image showing the background as infinity and an image expressed with a certain degree of three-dimensional effect on the background image. In this case, the image expressed with a certain degree of three-dimensional effect tends to be important rather than the background image. Accordingly, when performing brightness expanding processing on the image data, it is necessary to perform the brightness expanding processing focusing on the image data related to the image expressed with a three-dimensional effect.

According to the present embodiment, for each of the image data for the right eye and the image data for the left eye, the brightness expanding processing is performed on the reference region 200 which is most probably not a region related to the background image but a region related to the image to be expressed with a certain degree of three-dimensional effect because the parallax value exceeds a predetermined threshold value, while the brightness expanding processing is not performed on the reference region 200 which is most probably a region related to the background image because the parallax value is lower than the predetermined threshold value. Thus, the present embodiment can meet the above need appropriately.

In addition, the predetermined threshold value is appropriately set in advance through simulations and tests from a point of view in which the predetermined threshold value is a reference for distinguishing a background image from an image expressed with a certain degree of three-dimensional effect.

As described above, the image display device 1 according to the present embodiment includes: the feature value calculating section 30 which calculates an image feature value related to the brightness of image data on the basis of the image data for the right eye and the image data for the left eye which form 3D image data; the brightness expanding rate calculating section 40 (expanding coefficient calculating section) which calculates a brightness expanding rate, which is related to brightness expanding processing performed on the image data for the right eye and the image data for the left eye, on the basis of the image feature value calculated by the feature value calculating section; and the brightness expanding processing section 50 which performs brightness expanding processing on the image data on the basis of the parallax between the image data for the right eye and the image data for the left eye and the brightness expanding rate calculated by the brightness expanding rate calculating section 40.

More specifically, for each of the reference regions 200 formed by dividing the image data to be subjected to brightness expanding processing of the image data for the right eye and the image data for the left eye, the brightness expanding processing section 50 performs the brightness expanding processing on the image data corresponding to each region on the basis of the brightness expanding rate calculated by the brightness expanding rate calculating section 40 while reflecting the parallax in each reference region 200.

In this case, the brightness expanding processing section 50 does not perform the brightness expanding processing on the entire image data on the basis of one expanding coefficient as in the related art, for the image data for the right eye and the image data for the left eye. In other words, since the brightness expanding processing section 50 performs the brightness expanding processing on the image data corresponding to each reference region 200 while reflecting parallax in each of the reference regions 200 formed by dividing the image data, the brightness expanding processing section 50 can perform the effective brightness expanding processing which reflects parallax.

Moreover, in the present embodiment, the brightness expanding processing section 50 detects the amount of separation R between each reference region 200 of either the image data for the right eye or the image data for the left eye, which is to be subjected to brightness expanding processing, and a region corresponding to the reference region 200 in the other image data, calculates a parallax value which is positively correlated with the detected amount of separation R, and performs brightness expanding processing on the image data corresponding to each reference region 200 on the basis of the brightness expanding rate calculated by the brightness expanding rate calculating section 40 using the calculated parallax value.

As described above, the brightness expanding processing section 50 calculates the parallax value positively correlated with the amount of separation R and performs brightness expanding processing using the calculated parallax value. In addition, the parallax value used when performing the brightness expanding processing is positively correlated with the amount of separation R and is also positively correlated with the size of parallax in one reference region 200. Accordingly, by performing the brightness expanding processing using the parallax value, it is possible to execute the brightness expanding processing which reflects parallax (size of parallax) appropriately.

In addition, in the present embodiment, the brightness expanding processing section 50 performs the brightness expanding processing on the reference region 200, for which the calculated parallax value exceeds a predetermined threshold value, among the reference regions 200 of the image data to be subjected to brightness expanding processing.

Here, a mixed 3D image expressed by the image data for the right eye and the image data for the left eye may be formed by a background image showing the background as infinity and an image expressed with a certain degree of three-dimensional effect on the background image. In this case, the image expressed with a certain degree of three-dimensional effect tends to be important rather than the background image. Accordingly, when performing brightness expanding processing on the image data, it is necessary to perform the brightness expanding processing focusing on the image data related to the image expressed with a three-dimensional effect.

According to the present embodiment, for each of the image data for the right eye and the image data for the left eye, the brightness expanding processing is performed on the reference region 200 which is most probably not a region related to the background image but a region related to the image to be expressed with a certain degree of three-dimensional effect because the parallax value exceeds a predetermined threshold value, while the brightness expanding processing is not performed on the reference region 200 which is most probably a region related to the background image because the parallax value is lower than the predetermined threshold value. Thus, the present embodiment can meet the above need appropriately.

In addition, in the present embodiment, the light control element 120 is provided which controls light emitted from the light source 110 corresponding to the brightness expanding processing of the brightness expanding processing section 50.

Accordingly, for an image projected on the screen 5, it is possible to improve the contrast sensitivity by expanding the dynamic range of the image while maintaining the apparent brightness of the image.

Eighth Embodiment

Next, an eighth embodiment will be described.

In the present embodiment, the operation of the brightness expanding processing executing section 53 is different from that in the seventh embodiment described above.

For each reference region 200 of the image data to be subjected to brightness expanding processing of the image data for the right eye and the image data for the left eye, the brightness expanding processing executing section 53 according to the present embodiment corrects the brightness expanding rate such that the brightness expanding rate increases in proportion to the parallax value of the reference region and then executes the brightness expanding processing on the image data corresponding to the reference region 200.

Specifically, for each reference region 200 formed in the image data to be subjected to brightness expanding processing of the image data for the right eye and the image data for the left eye, the brightness expanding processing executing section 53 calculates the brightness expanding rate when performing the brightness expanding processing on the image data corresponding to each reference region 200 (hereinafter, referred to as a "corrected brightness expanding rate") on the basis of the following Expression (5).

$$T = kg \times D/D\max \qquad (5)$$

Here, T indicates a corrected brightness expanding rate, kg indicates a brightness expanding rate input from the brightness expanding rate calculating section 40 to the brightness expanding processing section 50, D indicates a parallax value of the reference region 200 to which the calculated corrected brightness expanding rate is applied, and Dmax indicates a maximum parallax value of parallax values of the reference regions 200 formed in the image data to be subjected to brightness expanding processing.

In addition, the brightness expanding processing executing section 53 calculates the corrected brightness expanding rates for all reference regions 200 formed in the image data, which is to be subjected to brightness expanding processing, using the above-described Expression (5) and performs the brightness expanding processing on each reference region 200 on the basis of the corrected brightness expanding rate applied to each reference region 200.

Here, a case where the corrected brightness expanding rate applied to a certain one reference region 200 is calculated using Expression (5) is considered.

In this case, "D/Dmax" in Expression (5) is a rate of the parallax value of the one reference region 200 to the maximum parallax value (maximum parallax value of parallax values of the reference regions 200 formed in the image data to be subjected to brightness expanding processing). Accordingly, if the parallax value of the one reference region 200 is a maximum parallax value, the value of "D/Dmax" becomes "1". If the parallax value of the one reference region 200 is a relatively low value compared with the maximum parallax value, the value of "D/Dmax" becomes smaller in proportion to the parallax value.

In addition, in Expression (5), the corrected brightness expanding rate (T) is calculated by multiplying the brightness expanding rate (kg), which is calculated by the brightness expanding rate calculating section 40, by "D/Dmax". For this reason, if the parallax value of the one reference region 200 is a maximum parallax value, the correction brightness expanding rate (T) becomes equal to the brightness expanding rate (kg). In this case, the brightness expanding processing is performed on the image data corresponding to the one reference region 200 using the brightness expanding rate (kg) calculated by the brightness expanding rate calculating section 40 as it is.

On the other hand, if the parallax value of the one reference region 200 is a relatively low value compared with the maximum parallax value, the corrected brightness expanding rate (T) becomes a relatively low value compared with the brightness expanding rate (kg) in proportion to the rate of the parallax value to the maximum parallax value. In this case, brightness expanding processing is performed on the image data corresponding to the one reference region 200 after correcting the brightness expanding rate (kg) calculated by the brightness expanding rate calculating section 40 such that the brightness expanding rate (kg) becomes low in proportion to the rate of the parallax value to the maximum parallax value.

That is, in the present embodiment, the brightness expanding processing is performed on the reference region 200 with a maximum parallax value using the brightness expanding rate calculated by the brightness expanding rate calculating section 40 as it is, while the brightness expanding processing is performed after correcting the brightness expanding rate to become low as the parallax value became small.

The reason why the brightness expanding processing is performed after correcting the brightness expanding rate as described above in the present embodiment is as follows.

That is, in a mixed 3D image expressed by the image data for the right eye and the image data for the left eye, an image related to an object expressed so as to be present further forward tends to be a more important image in which a three-dimensional effect or activeness is emphasized. Accordingly, when executing brightness expanding processing, it is necessary to execute the brightness expanding processing on the image data of the image related to such an object on the basis of an expanding coefficient with a higher brightness expanding rate. In this case, by adopting the above-described configuration in which the brightness expanding processing is performed on the reference region 200 with a maximum parallax value using the brightness expanding rate calculated by the brightness expanding rate calculating section 40 as it is while the brightness expanding processing is performed after correcting the brightness expanding rate to become low as the parallax value became small, it becomes possible to execute the brightness expanding processing on the image data of an image related to an object, which is expressed so as to be present further forward, on the basis of an expanding coefficient with a higher brightness expanding rate.

As described above, in the present embodiment, for each reference region 200 of the image data to be subjected to brightness expanding processing, the brightness expanding processing section 50 corrects the brightness expanding rate such that the brightness expanding rate increases in proportion to the parallax value of the reference region 200 and then executes the brightness expanding processing on the image data corresponding to each reference region 200.

Therefore, as described above, it becomes possible to execute the brightness expanding processing on the image data of an image related to an object, which is expressed so as to be present further forward, on the basis of an expanding coefficient with a higher brightness expanding rate. As a result, effective brightness expanding processing which reflects parallax can be realized by the brightness expanding processing section.

Ninth Embodiment

Next, a ninth embodiment will be described.

In the present embodiment, the operation of the brightness expanding processing executing section 53 is different from that in the seventh embodiment described above.

For each reference region 200 of the image data to be subjected to brightness expanding processing, the brightness expanding processing executing section 53 according to the present embodiment detects the frequency of the reference region 200 having almost the same parallax value, corrects the brightness expanding rate such that the brightness expanding rate increases in proportion to the frequency of the reference region 200, and then executes the brightness expanding processing on the image data corresponding to each reference region 200.

Specifically, first, the brightness expanding processing executing section 53 acquires upper and lower limits of the parallax value on the basis of the parallax values of the reference regions 200 of the image data for the right eye input from the parallax value calculating section 52 and divides a predetermined number of ranges between the upper and lower limits. Then, the brightness expanding processing executing section 53 detects the number of reference regions 200 with a parallax value in each separate range. For example, the brightness expanding processing executing section 53 detects that the number of reference regions 200 satisfying value A1≤parallax value<value A2 is 20 and the number of reference regions 200 satisfying value A2≤parallax value<value A3 is 15.

Then, on the basis of the detection result, the brightness expanding processing executing section 53 generates a histogram having the parallax value, which is divided to fall within a predetermined range, as a class and the number (frequency) of reference regions 200, which have a parallax value within the range, as a frequency. By referring to the histogram generated herein, it is possible to detect, for one reference region 200, how many reference regions 200 with a parallax value belonging to the same range as the parallax value of the one reference region 200 are present in the image data for the right eye. That is, the frequency of the reference region 200 having almost the same parallax value in the image data for the right eye can be detected for each reference region 200 by referring to the histogram.

Similarly, on the basis of the parallax value of the reference region 200 of the image data for the left eye input from the parallax value calculating section 52, the brightness expanding processing executing section 53 generates a histogram having the parallax value, which is divided to fall within a predetermined range, as a class and the number (frequency) of reference regions 200, which have a parallax value within the range, as a frequency.

In addition, in the following explanation, the "frequency of the parallax value of the reference region 200" refers to the number of reference regions 200 having a parallax value belonging to the same range as the parallax value of the reference region 200.

Then, for each reference region 200 formed in the image data to be subjected to brightness expanding processing of the image data for the right eye and the image data for the left eye, the brightness expanding processing executing section 53 calculates the brightness expanding rate when performing the brightness expanding processing on the image data corresponding to each reference region 200 (hereinafter, referred to as a "corrected brightness expanding rate") on the basis of the following Expression (6).

$$T = kg \times F/F\max \qquad (6)$$

Here, T indicates a corrected brightness expanding rate, kg indicates a brightness expanding rate input from the brightness expanding rate calculating section 40 to the brightness expanding processing section 50, F indicates the frequency of the parallax value of the reference region 200 to which the calculated corrected brightness expanding rate is applied, and Fmax indicates a maximum value of the frequency (hereinafter, referred to as a "maximum frequency") of the parallax value of the reference region 200 formed in the image data to be subjected to brightness expanding processing.

In addition, the brightness expanding processing executing section 53 calculates the corrected brightness expanding rates for all reference regions 200 formed in the image data, which is to be subjected to brightness expanding processing, using the above-described Expression (6) and performs the brightness expanding processing on each reference region 200 on the basis of the corrected brightness expanding rate applied to each reference region 200.

Here, a case where the corrected brightness expanding rate applied to certain one reference region 200 is calculated using Expression (6) is considered.

In this case, "F/Fmax" in Expression (6) is a rate of the frequency of the parallax value of the one reference region 200 to the maximum frequency (maximum value of the frequency of the parallax value of the reference regions 200 formed in the image data to be subjected to brightness expanding processing). Accordingly, if the frequency of the parallax value of the one reference region 200 is a maximum parallax value, the value of "F/Fmax" becomes "1". If the frequency of the parallax value of the one reference region 200 is a relatively low value compared with the maximum frequency, the value of "F/Fmax" becomes smaller in proportion to the frequency.

In addition, in Expression (6), the corrected brightness expanding rate (T) is calculated by multiplying the brightness expanding rate (kg), which is calculated by the brightness expanding rate calculating section 40, by "F/Fmax". For this reason, if the frequency of the parallax value of the one reference region 200 is a maximum frequency, the correction brightness expanding rate (T) becomes equal to the brightness expanding rate (kg). In this case, the brightness expanding processing is performed on the image data corresponding to the one reference region 200 using the brightness expanding rate (kg) calculated by the brightness expanding rate calculating section 40 as it is.

On the other hand, if the frequency of the parallax value of the one reference region 200 is a relatively low value compared with the maximum frequency, the corrected brightness expanding rate (T) becomes a relatively low value compared with the brightness expanding rate (kg) in proportion to the rate of the frequency of the parallax value to the maximum frequency. In this case, brightness expanding processing is performed on the image data corresponding to the one reference region 200 after correcting the brightness expanding rate (kg) calculated by the brightness expanding rate calculating section 40 such that the brightness expanding rate (kg) becomes low in proportion to the rate of the frequency of the parallax value to the maximum frequency.

That is, in the present embodiment, the brightness expanding processing is performed on the reference region 200 with a maximum frequency of the parallax value using the brightness expanding rate calculated by the brightness expanding rate calculating section 40 as it is, while the brightness expanding processing is performed after correcting the brightness expanding rate to become low as the frequency of the parallax value became small.

The reason why the brightness expanding processing is performed after correcting the brightness expanding rate as described above in the present embodiment is as follows.

That is, in a mixed 3D image expressed by the image data for the right eye and the image data for the left eye, an image related to an object, which has a large number of objects expressed such that the positions in a depth direction are almost the same compared with other objects, tends to be an important image in the 3D image. Accordingly, when executing brightness expanding processing, it is necessary to execute the brightness expanding processing on the image data of the image related to such an object on the basis of an expanding coefficient with a higher brightness expanding rate. In the present embodiment, by adopting the configuration in which the brightness expanding processing is performed on the reference region 200 with a maximum frequency of the parallax value using the brightness expanding rate calculated by the brightness expanding rate calculating section 40 as it is while the brightness expanding processing is performed after correcting the brightness expanding rate to become low as the frequency of the parallax value became small, it becomes possible to execute the brightness expanding processing on the image data of an image related to an object, which is expressed so as to be present further forward, on the basis of an expanding coefficient with a higher brightness expanding rate. Thus, the present embodiment can meet the above need appropriately.

As described above, in the present embodiment, the brightness expanding processing section 50 detects the frequency of the reference region 200 having almost the same parallax value for each reference region 200 of the image data to be subjected to brightness expanding processing, corrects the brightness expanding rate such that the brightness expanding rate increases in proportion to the frequency of the reference region 200, and then executes the brightness expanding processing on the image data corresponding to each reference region 200.

Therefore, as described above, it becomes possible to execute the brightness expanding processing on the image data of an image related to an object, which is expressed so as to be present further forward, on the basis of an expanding coefficient with a higher brightness expanding rate. As a result, effective brightness expanding processing which reflects parallax can be realized by the brightness expanding processing section.

In addition, the embodiments described above are for illustrative purposes, and any modification and application may be arbitrarily made within the scope of the invention.

For example, although the image input section 20 generates the image data for the right eye and the image data for the left eye from the input 3D image signal and outputs the image data for the right eye and the image data for the left eye alternately, the invention is not limited to this configuration. For example, the brightness expanding processing section 50 may output the image data for the right eye and the image data for the left eye alternately to the light valve 130.

In addition, each functional section described above indicates the functional configuration of the image display device 1, and the specific mounting form thereof is not particularly limited. That is, an individual hardware component corresponding to each functional section does not necessarily need to be mounted, and one processor may execute a program to realize the functions of a plurality of functional sections.

In addition, although an example of the configuration in which the image display device 1 includes various functional sections, such as the feature value calculating section 30, the brightness expanding rate calculating section 40, and the brightness expanding processing section 50, and these functional sections execute the calculation of the image feature value, the calculation of the brightness expanding rate, the brightness expanding processing, and the like has been described in the present embodiment, it is also possible to adopt a configuration in which an image supply device such as a personal computer, which is provided separately from the image display device 1, includes various functional sections, and performs brightness expanding processing on the image data for the right eye and the image data for the left eye and supplies these image data from the image processor to a projector. That is, the image display device 1 itself may have the functions of various functional sections involving the feature value calculating section 30, the brightness expanding rate calculating section 40, and the brightness expanding processing section 50, or an image supply device which supplies the image data to the image display device 1 may have the functions of various functional sections involving the feature value calculating section 30, the brightness expanding rate calculating section 40, and the brightness expanding processing section 50.

In addition, although the image display device 1 is a device which projects an image on the screen 5 using the transmissive light valve 130, the image display device 1 may be a projector using a reflective liquid crystal panel or may be a DMD projector using a digital mirror device. In addition, the invention is not limited to the 3-LCD projector which project a color image with three light valves, but may also be applied to a projector which projects a color image by displaying an image corresponding to RGB in a time division manner using one liquid crystal light valve, a single-plate DMD projector including a color wheel, and a 3-DMD projector. In addition, various light sources, such as a xenon lamp, an ultrahigh-pressure mercury lamp, and an LED lamp, may be used as the light source as described above. In addition, the image display device 1 described above may be the image display device 1 which is disposed at the front side of the projection surface and projects projection light on the front of the projection surface, or may be the image display device 1 which is disposed at the rear side of the projection surface and projects projection light on the back of the projection surface. That is, the invention can be widely applied to image display devices which have a function of modulating light emitted from a light source.

In addition, the image display device 1 according to the embodiment of the invention is not limited to the projector which projects a 3D image on the screen 5 as described above. Various display devices including self-emission type display devices, such as an LCD monitor or an LCD television which displays a 3D image on a liquid crystal display panel, a monitor device or a television receiver which displays a 3D image on a PDP (Plasma Display Panel), and a monitor device or a television receiver which displays a 3D image on an organic EL display panel called an OLED (Organic Light-Emitting diode), an OEL (Organic Electro-Luminescence), or the like are also included in the image display device according to the embodiment of the invention. In this case, the liquid crystal display panel, the plasma display panel, and the organic EL display panel are equivalent to an image display section.

What is claimed is:

1. An image display device comprising:
at least one processor configured to execute one or more programs to realize one or more functions of:
a feature value calculating section which
receives image data for a right eye and image data for a left eye, which together form 3D image data,
divides one of the image data for the right eye and the image data for the left eye into a plurality of reference regions,
detects, on each reference region, an amount of separation between the reference region and a region in the other image data corresponding to the reference region,
calculates a parallax value positively correlated with the detected amount of separation for each reference region, and
calculates an image feature value related to a brightness of the one of the image data for the right eye and the image data for the left eye on the basis of a brightness of such reference regions as have the calculated parallax value exceeding a predetermined threshold value that is set in advance;
an expanding coefficient calculating section which calculates an expanding coefficient, which is related to brightness expanding processing performed on the image data for the right eye and the image data for the left eye, on the basis of the image feature value calculated by the feature value calculating section;
a brightness expanding processing section which performs the brightness expanding processing on the image data for the right eye and the image data for the left eye on the basis of the expanding coefficient calculated by the expanding coefficient calculating section; and
an image display section which displays an image on the basis of the image data for the right eye and the image data for the left eye subjected to the brightness expanding processing.

2. The image display device according to claim 1, wherein the feature value calculating section gives a weighting to at least either the image data for the right eye or the image data for the left eye such that the weighting is reflected in the calculated image feature value in proportion to the parallax value of the reference region and then calculates the image feature value on the basis of the information regarding each reference region.

3. The image display device according to claim 1, wherein the feature value calculating section detects the frequency of the reference regions with almost the same parallax value for at least either the image data for the right eye or the image data for the left eye, gives a weighting to the image data such that the weighting is reflected in the calculated image feature value in proportion to the frequency of the reference regions, and then calculates the image feature value on the basis of the information regarding each reference region.

4. The image display device according to claim 1, further comprising:
a modulation section which modulates light emitted from a light source; and a light modulating section which modulates the light emitted from the light source corresponding to the brightness expanding processing of the brightness expanding processing section, wherein the brightness expanding processing section outputs the image data for the right eye and the image data for the left eye, which have been subjected to the brightness expanding processing, to the modulation section.

5. The image display device according to claim 1, wherein the image feature value comprises, for the one of the image data for the right eye and the image data for the left eye, at least one of a maximum brightness value of the image data, an average brightness value of the image data, a minimum brightness value of the image data, and a brightness histogram of the image data.

6. An image processing method comprising:

receiving image data for a right eye and image data for a left eye, which together form 3D image data;

dividing one of the image data for the right eye and the image data for the left eye into a plurality of reference regions;

detecting, on each reference region, an amount of separation between the reference region and a region in the other image data corresponding to the reference region;

calculating a parallax value positively correlated with the detected amount of separation for the reference region;

calculating an image feature value related to a brightness of the one of the image data for the right eye and the image data for the left eye on the basis of a brightness of such reference regions as have the calculated parallax value exceeding a predetermined threshold value that is set in advance;

calculating an expanding coefficient, which is related to brightness expanding processing performed on the image data for the right eye and the image data for the left eye, on the basis of the calculated image feature value; and performing the brightness expanding processing on the image data for the right eye and the image data for the left eye on the basis of the calculated expanding coefficient.

7. An image display device comprising:

at least one processor that executes one or more programs to realize one or more functions of:

a feature value calculating section which receives image data for a right eye and image data for a left eye, which form 3D image data, and calculates an image feature value related to a brightness of image data on the basis of the image data for the right eye and the image data for the left eye;

an expanding coefficient calculating section which calculates an expanding coefficient, which is related to brightness expanding processing performed on the image data for the right eye and the image data for the left eye, on the basis of the image feature value calculated by the feature value calculating section;

a brightness expanding processing section which
divides either the image data for the right eye or the image data for the left eye, which is to be subjected to the brightness expanding processing, into a plurality of reference regions, detects, on each reference region, an amount of separation between the reference region and a region in the other image data corresponding to the reference region, calculates a parallax value positively correlated with the detected amount of separation for each reference region, and performs the brightness expanding processing on the image data for the right eye and the image data for the left eye on the basis of the expanding coefficient calculated by the expanding coefficient calculating section; and an image display section which displays an image on the basis of the image data for the right eye and the image data for the left eye subjected to the brightness expanding processing, wherein the brightness expanding processing section performs the brightness expanding processing on only the image data corresponding to such reference regions as have the calculated parallax value exceeding a predetermined threshold value that is set in advance.

8. The image display device according to claim 7, wherein the brightness expanding processing section corrects the expanding coefficient for each reference region of the image data to be subjected to brightness expanding processing such that a brightness expanding rate increases in proportion to the calculated parallax value of the reference region and then performs the brightness expanding processing on the image data corresponding to each reference region.

9. The image display device according to claim 7, wherein the brightness expanding processing section detects the frequency of the reference regions with almost the same parallax value for each reference region of the image data to be subjected to brightness expanding processing, corrects the expanding coefficient such that a brightness expanding rate increases in proportion to the frequency of the reference regions, and then performs the brightness expanding processing on the image data corresponding to each reference region.

10. The image display device according to claim 7, further comprising:

a modulation section which modulates light emitted from a light source; and a light modulating section which modulates the light emitted from the light source corresponding to the brightness expanding processing of the brightness expanding processing section, wherein the brightness expanding processing section outputs the image data for the right eye and the image data for the left eye, which have been subjected to the brightness expanding processing, to the modulation section.

11. The image display device according to claim 5, wherein the maximum brightness value is white peak value of whole image data, the average brightness value is an average picture level of whole image data, and the minimum brightness value is a black peak value of whole image data.

* * * * *